United States Patent [19]

Larson

[11] 3,952,796

[45] Apr. 27, 1976

[54] TEMPERATURE CONTROL SYSTEM
[76] Inventor: Richard C. Larson, 220 Crescent Parkway, Sea Girt, N.J. 08750
[22] Filed: Apr. 7, 1975
[21] Appl. No.: 565,613

[52] U.S. Cl. .................................. 165/40; 236/1 C; 236/101 B
[51] Int. Cl.² ........................................ F25B 29/00
[58] Field of Search ..................... 236/101, 93, 1 C; 165/40

[56] References Cited
UNITED STATES PATENTS

| | | | |
|---|---|---|---|
| 1,894,618 | 1/1933 | King | 236/93 UX |
| 3,125,292 | 3/1964 | Larson | 236/1 |
| 3,172,600 | 3/1965 | Miner | 236/1 C |
| 3,273,797 | 9/1966 | Grahl | 236/1 C |

Primary Examiner—William E. Wayner
Attorney, Agent, or Firm—Mason, Fenwick & Lawrence

[57] ABSTRACT

An automatic temperature responsive control valve is disclosed for use in combination heating and cooling systems including two concentric valve sleeves each rotating individually in the valve body under the control of respective bimetallic transducers one of which directs work fluid to either a heating heat exchanger or a cooling heat exchanger in accordance with the temperature of work fluid supplied to the valve by either a chiller or a boiler through a solenoid valve controlled by the outside temperature and the other of which provides modulated flow through the heating or cooling means under the control of the spent fluid temperature. The control valve is usable for controlling the temperature of one or more rooms or for similar control of a process vessel so as to provide unique versatility of use.

41 Claims, 19 Drawing Figures

U.S. Patent  April 27, 1976  Sheet 2 of 4  3,952,796
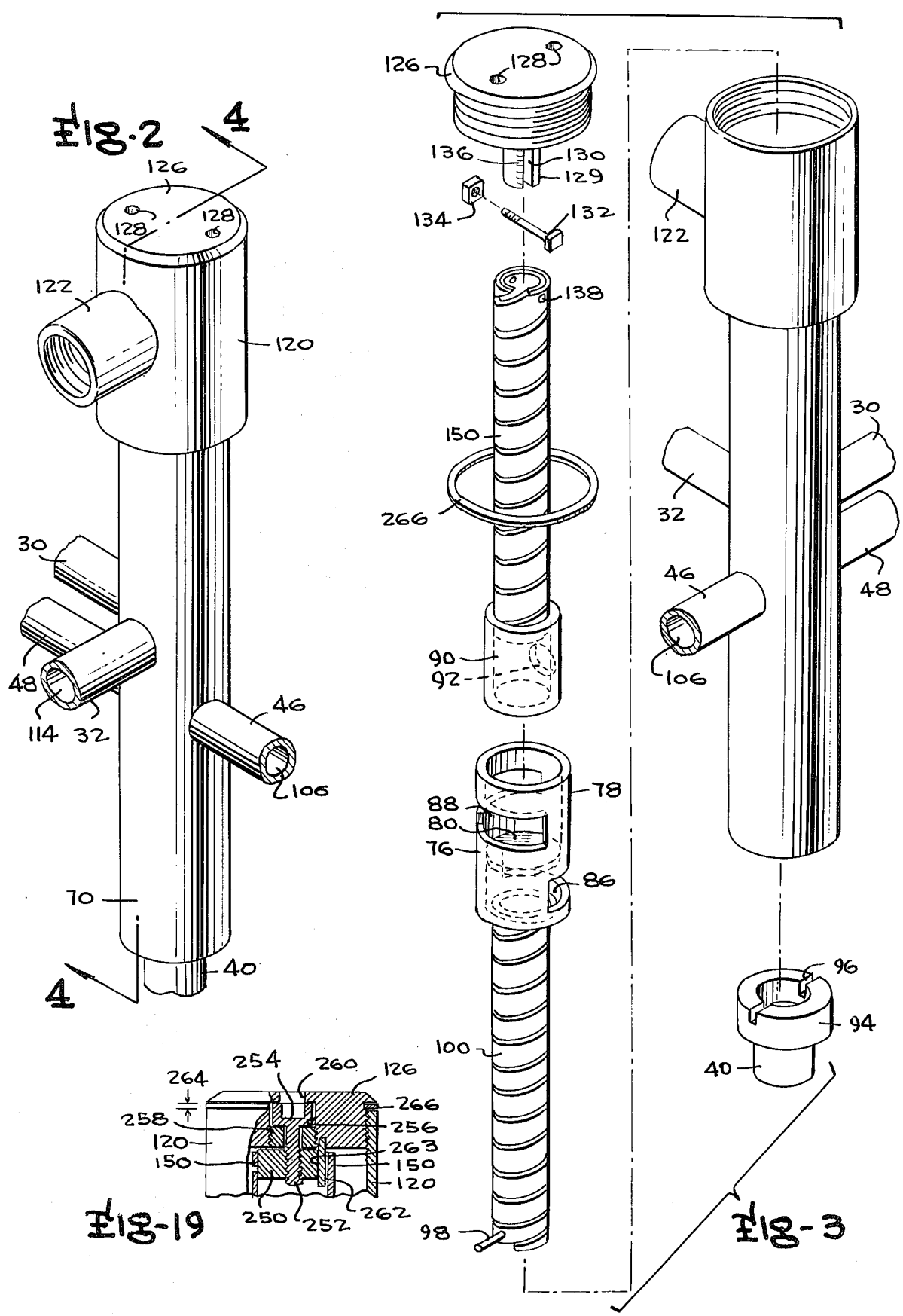

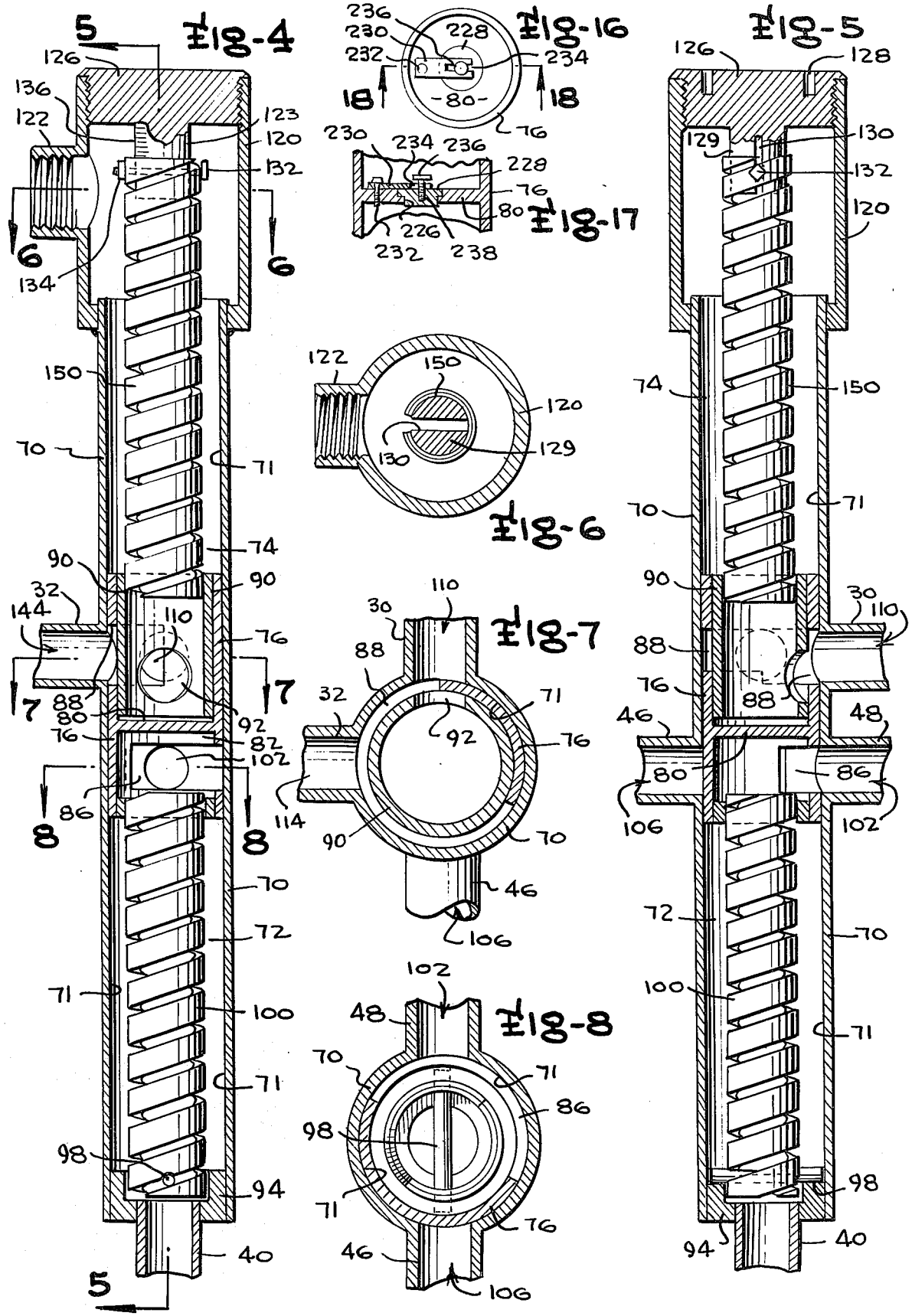

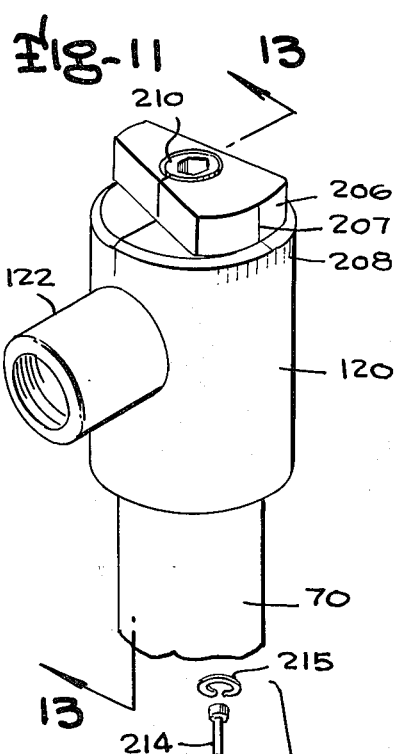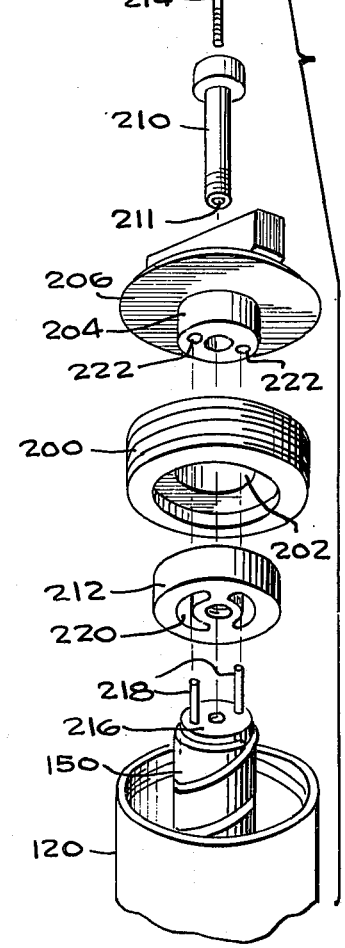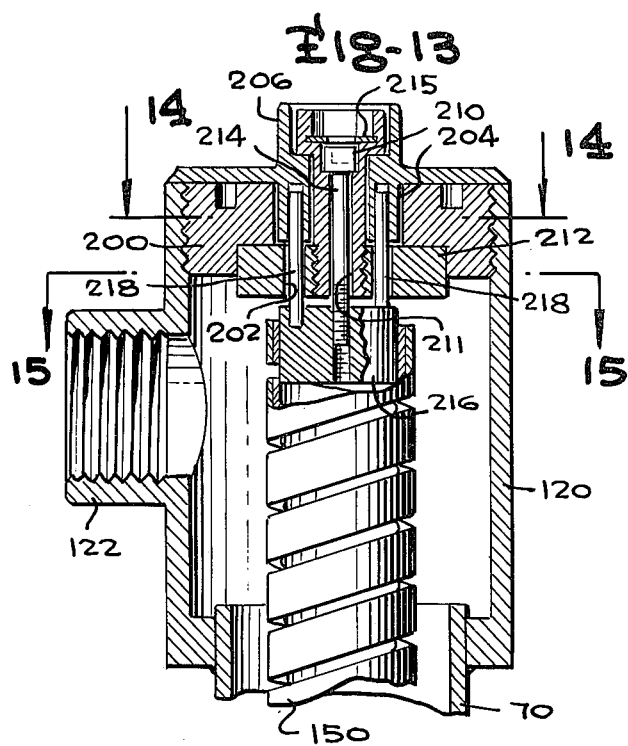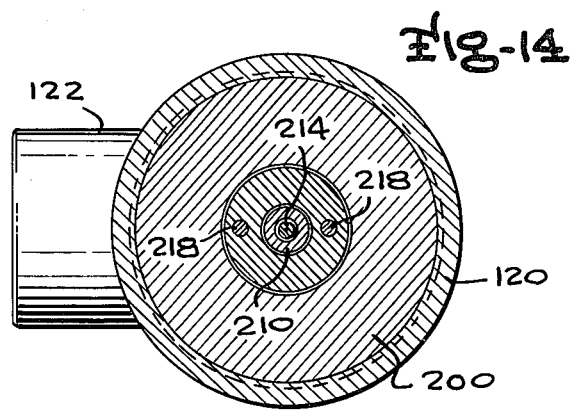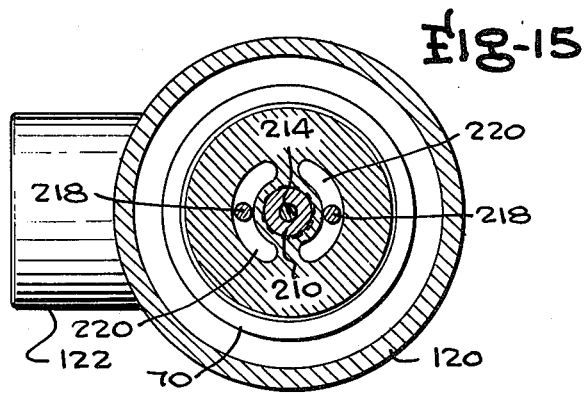

TEMPERATURE CONTROL SYSTEM

BACKGROUND OF THE INVENTION

This invention is in the field of control valves for area conditioning systems in which heated or cooled fluid is provided for maintaining a desired temperature in a heat controlled area.

More specifically, one embodiment of the invention is directed to a unique valving and control system for providing cooled or heated fluid to a room, plural rooms or similar areas, while another embodiment is directed to means for providing heated or cooled fluid in regulated amounts to an industrial process tank or the like. The term "fluid" as used throughout the specification and claims is used in its broadest sense and should be understood to include gaseous as well as liquid substances.

This invention enables a sustained conservation of energy through fuel savings by maintaining an even temperature in the controlled area while using boilers and chillers of the intermittent type employing conventional controls. These are standard for oil and gas fired energy sources. Moreover, the subject invention can be incorporated in present installations with a minimum of expense and disruption. Further advantages are enabled by the instant invention in that it eliminates the need for wall thermostats while remaining completely automatic in operation.

Other cost advantages of the invention are enabled by virtue of the fact that it can be fabricated with standard machinery and is easy to assemble and has a small number of parts with respect to the related valves. The foregoing factors also enable substantial savings in maintenance costs with additional savings accruing by virtue of the fact that the valving components can be inspected or replaced in an installation without disturbing the piping of the system.

The present invention represents an improvement over the inventions of my prior Patents being numbered U.S. Pat. Nos. 3,125,292, 3,385,520 and 3,498,536. A large swing in radiator temperature (20° F) is almost universal in this country and in Europe and the above related patents have a small range of modulating temperature about 4° F so that they are restricted to radiators of uniform temperature. A primary advantage of the inventive valve is a large range of rotational modulation (85° F and more) which is more than sufficient for all radiator temperatures and most industrial needs.

And again, the above related patents are restricted to three-pipe heating and cooling systems, whereas the inventive valve can be used with three-pipe or four-pipe systems which makes it more suitable for applications of more than one area, and this is because of a novel dual heating and cooling systems changeover which operates simultaneously for supply fluids and spent fluids.

And yet again, a most important innovation incorporated within the inventive valve is that the size of the modulating port is adjustable over a wide range after installation.

Therefore, it is the primary object of this invention to provide a new and improved temperature responsive automatically operable valve means.

Another object of the invention is the provision of a new and improved operational technique of both new and existing heating and cooling systems for achieving optimum efficiency.

And another object of the invention is to have means to adjust the size of the flow modulating port of the valve after the valve has been assembled and installed.

Yet another object of the invention is to incorporate within the confines of the valve a simultaneous and dual temperature responsive heating and cooling systems changeover for the fluids supplied to the valve and for the spent fluids returning to the valve.

Another object of the invention is to have a range of fluid modulation that is sufficient to modulate the temperature changes of non-uniform radiators of all heating and cooling systems of the general practice on America and Europe.

And yet another object of the invention is the provision of a new and improved highly reliable air conditioning and heating control valve means and systems that are economical and and are interchangeable with prior known heating and air conditioning systems.

Yet another object of the invention is the provision of new and improved valve means providing modulating work fluid flow control both during heating and cooling modes of operation in response to changes in temperature of spent work fluid employed in heat exchangers in the area being heated or cooled.

Yet another object of the invention is the provision of new and improved valve employing tamper proof construction for use in public buildings and the like.

Yet another object of the invention is the provision of a heating and cooling system which eliminates the need for wall thermostats and other previously known control elements so as to provide a new and improved simplified system.

Another object of the invention is the provision of an improved control valve that will fit within the piping schemes of the general practice of heating and cooling systems.

And another object of the invention is the provision of a new and improved automatic control valve in which all of the valving component parts are inserted into the valve body after the valve body has been installed into the system to protect them and also that they may be removed for inspection and for replacement during the life time of the system.

And yet another object of the invention is the provision of a new and improved control valve which can be conveniently reset for a change in the temperature of the area being heated or cooled.

Another object of the invention is the provision of a new and improved automatic control valve in which the conservation of energy has been duly practiced in the building of the valve, in the operation of the valve and in the operation of the systems in which the valve is used.

Achievement of the foregoing objects is enabled by the present invention through the provision of a control valve comprising a hollow cylindrical valve body member in which a compound sleeve separates the interior of the body member into an infeed flow chamber and a return flow chamber, both chambers having an inlet pipe connection and two outlet pipe connections.

The compound sleeve is slaved to a heat responsive transducer in the infeed flow chamber and is thereby rotated accordingly to the supply fluid temperature and is fitted with corresponding heating fluid and cooling fluid ports around its periphery (a pair in each chamber) to provide the open-close, close-open relationship of the ports with respect to the two outlet pipes in each chamber; directing heating fluid to the heating radiator and spent heating fluid to the boiler while the system remains in the heating mode, and directing cooling fluid to the cooling radiator and spent cooling fluid to the chiller while the system is in the cooling mode; and, providing the simultaneous dual switchover of the heating mode to the cooling mode and vice-versa.

A circular nested valve sleeve having a port through its wall is slaved to heat responsive transducer in the return fluid chamber and is nested within the compound valve sleeve and has a rotational relationship with respect to the edges of the upper port of the compound valve sleeve such that it quantitatively meters the spent heating fluid which has in turn flowed from the heating radiator into the inlet pipe of the return flow chamber, over and around the transducer, through the nested valve sleeve port and the compound valve sleeve port assembly and thence into the outlet pipe and to the boiler. The cooled spent fluid goes through a likewise series of systematic actions.

The circular nested valve sleeve is adjustable in a rotational manner and with respect the compound valve sleeve to select the temperature of the spent fluid at which the area is to be heated or cooled.

The circular nested valve sleeve is also adjustable with respect to the peripheral edge of the upper compound valve sleeve port so that the area of its port is progressively made smaller to give a selection of full open fluid flow values.

It is practicable to use parts and parcels of heating and cooling systems which are not necessarily matched, without the energy conservation qualities of the inventive valve being negated, as the valve physically and operationally couples the boiler with the heating radiator and the chiller with the cooling radiator and uses only the amount of the energy of the fluid that is necessary to satisfy the needs of the area or the process.

It is practicable to provide shelf items, such as sleeve-transducer and tube-transducer assemblies with graduated characteristics, so as to modify any given inventive valve installation in a matter of minutes.

It is practicable to manufacture the inventive valve in outlet pipe sizes from ½ to 12 inches.

A better understanding of the present invention will be achieved when the following written description is considered in conjunction with the hereinafter described appended drawings.

DESCRIPTION OF THE DRAWINGS

FIG. 2 is a perspective view of one of the preferred embodiments of the valve means comprising a primary element of the invention;

FIG. 3 is an exploded perspective view of the valve as shown in FIG. 2;

FIG. 4 is a verticle sectional view taken along lines 4—4 of FIG. 2;

FIG. 5 is a vertical sectional view taken along lines 5—5 of FIG. 4;

FIG. 6 is a horizontal sectional view taken along lines 6—6 of FIG. 4;

FIG. 7 is a horizontal sectional view taken along lines 7—7 of FIG. 4;

FIG. 8 is a horizontal sectional view taken along lines 8—8 of FIG. 4;

FIG. 11 is a perspective view of a portion of another embodiment of the valve;

FIG. 12 is an exploded perspective view of the portion of the valve of FIG. 11;

FIG. 13 is a vertical sectional view taken along lines 13—13 of FIG. 11;

FIG. 14 is a horizontal sectional view taken along lines 14—14 of FIG. 13;

FIG. 15 is a horizontal sectional view taken along lines 15—15 also of FIG. 13;

FIG. 16 is a plan view of another embodiment of a portion of the valve;

FIG. 17 is a horizontal sectional view taken along lines 17—17 of FIG. 15;

FIG. 19 is a partial vertical view of a portion of another embodiment of the valve.

DESCRIPTION OF THE PREFERRED EMBODIMENT

Figure 1:
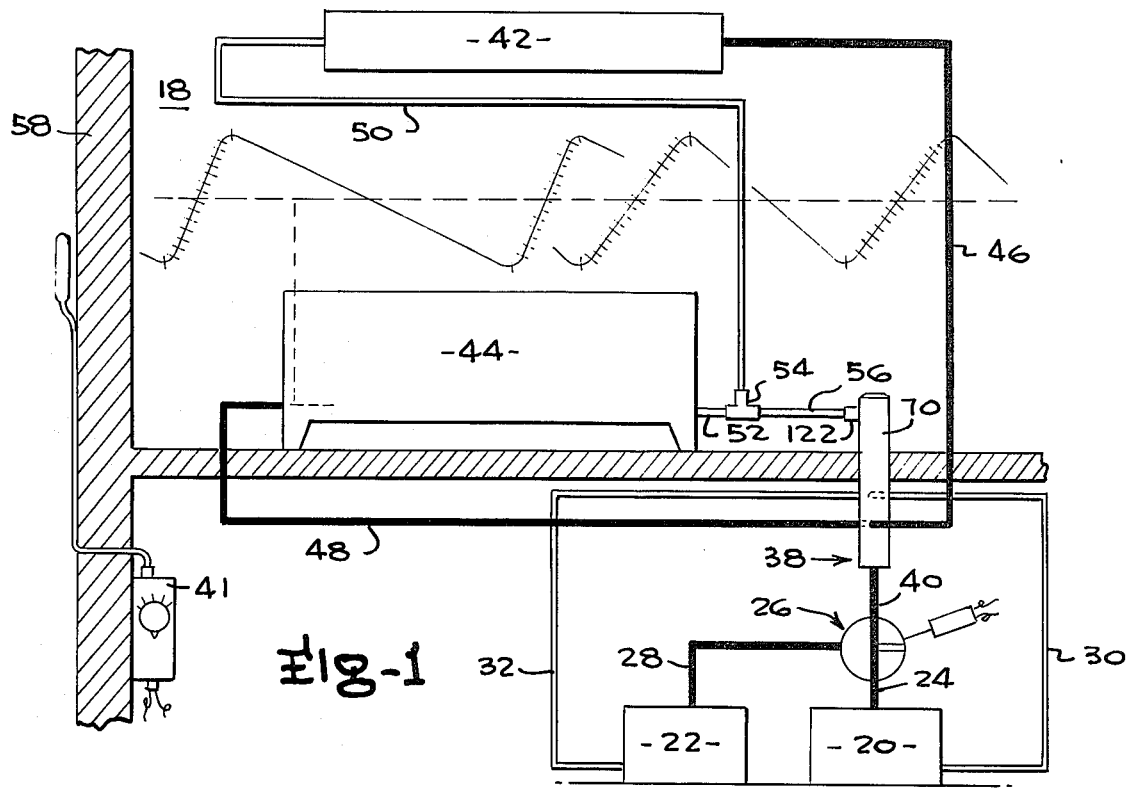
FIG. 1 is a schematic illustration of the inventive system as employed in conjunction with a space cooling heat exchange means and a space heating heat exchange means which are used alternatively for heating and cooling an area such as a single room of a building.

Attention is initially invited to FIG. 1 of the drawings which illustrates the inventive system employed in a system for heating and cooling a single room area 18. The system includes a conventional source of hot fluid supply 20 such as a boiler or the like and a conventional source of cold fluid supply such as a chiller 22 both of which include circulating means such as a pump or the like.

A hot fluid supply pipe 24 extends from the boiler 20 to an inlet on a conventional three-way solenoid valve 26 which can be a commercial item with a built-in solenoid coil such as General Controls No. K103AA4432. A similar cold fluid supply pipe 28 extends from the outlet of the chiller 22 to the solenoid valve 26. A boiler feed pipe 30 is connected to the supply inlet of the boiler 20 and a similar chiller feed pipe 32 is connected to the supply inlet of the chiller 22 with opposite ends of the pipes 30 and 32 being connected to the inventive valve 38 which is of the automatic control type.

A common hot and cold supply fluid pipe 40 extends from the common outlet of the solenoid valve 26 which is operable to connect the common pipe 40 with the hot fluid supply pipe 24 from boiler 20 or with the cold fluid supply pipe 28 from chiller 22 in accordance with the state of operation of a thermostat 41 which can be a commercial heating and cooling changeover type with tube and remote bulb factory assembled and including a factory calibrated temperature dial such as Honeywell T675A. When the coil of solenoid valve 26 is energized, the valve of solenoid valve 26 is positioned to communicate the hot and cold supply fluid pipe 40 with the cold fluid supply 28; and when the coil is not energized, common pipe 40 is connected to the hot fluid supply pipe 24 as shown in FIG. 1.

The area 18 of a building to be heated and/or cooled by the inventive system is provided with a cooling heat exchanger 42 of conventional design which, when operated, serves to cool the area 18 and a heating heat exchanger 44 which, when operated, serves to heat the area 18 in a conventional manner. Chilled working fluid is provided the cooling heat exchanger 42 by means of a cold fluid supply pipe 46 extending from the control valve 38 and connected on its other end to the cooling heat exchanger 42.

Similarly, the heating heat exchanger 44 is provided with hot working fluid from the control valve 38 by means of a hot fluid supply pipe 48 in a manner as illustrated in FIG. 1. A cold spent fluid return pipe 50 extends from the outlet of the cooling heat exchanger 42 and a similar hot spent fluid return pipe 52 extends from the outlet of the heating heat exchanger 44. Spent working fluids from the heat exchangers 42 and 44 flows via the pipes 50 and 52 to a fitting 54 connected to a hot and cold common spent fluid return pipe 56 which is connected on its opposite end to the control valve 38.

The remote temperature sensing bulb of the thermostat 41 being located exterior to the building 58 in which area 18 is located can have its temperature setting dial, for example, set to 72° F and its differential setting dial, for example, set to 8; and at these settings the outdoor temperature will activate the thermostat 41 to switch the energy mode of the system to the heating mode only whenever the outdoor temperature is at 68° F or lower, and in a like manner to the cooling mode only whenever the outdoor temperature is at 76° F or higher. The electric wiring is of common practice and therefore is not shown.

FIGS. 2–8 illustrate the details of the control valve 38 the components of which are mounted in a cylindrical housing 70 having a smooth inner surface 71 and which housing is separated into a fluid infeed flow chamber 72 and a fluid return flow chamber 74 by a compound valve sleeve 76 with an outer surface 78 matingly engaged with the inner surface 71 of the housing 70. The compound valve sleeve 76 is best illustrated in FIG. 3 and has a transverse chamber-separating wall 80, a hot and cold infeed fluid supply port 86 in chamber 72 and a hot and cold spent fluid return port 88 on the opposite side of wall 80 and in chamber 74.

In the heating mode of the system, port 86 links chamber 72 with pipe 48 and port 88 couples chamber 74 with pipe 30. In the cooling mode of the system, port 86 couples chamber 72 with pipe 46 and port 88 links chamber 74 with pipe 32. It is to be noted that the ports 86 and 88 extend arcuately about a substantial portion of the periphery of the compound valve sleeve 76 as best illustrated in FIGS. 3, 7 and 8.

A cylindrical nested valve sleeve 90 which can be adjusted rotationally and also along its longitudinal axis is matingly received within the compound valve sleeve 76 in chamber 74. A bore through the wall of nested valve sleeve 90 provides the port 92 which operates in conjunction with port 88 to provide a metering of the flow of fluid through the system in a manner as will become apparent hereinafter.

Hot and cold fluid infeed pipe 40 is axially fixed in the lowermost end of the housing 70 as in FIG. 4 by means of a reducing bushing 94 having a pair of opposite recessed channels 96 (FIG. 3) to receive rod 98 which is fixed into the lower end of transducer 100, fixing it rotationwise but allowing it to be lifted out and replaced as necessary. Transducer 100 has its upper end fixed to compound valve sleeve 76 as shown in FIGS. 3, 4 and 5; and whenever there is a change in the temperature of the fluid in chamber 72, in which transducer 100 is located, there will be a corresponding rotational movement of the compound valve sleeve 76.

Axially aligned diametric bores 102 and 106 communicate with pipes 48 and 46 respectively and are in turn connected to radiators 44 and 42. Bores 102 and 106 are also in register with port 86 (FIGS. 1, 5 and 8).

Normally aligned radial bores 110 and 114 in partial register with port 88 communicate with pipes 30 and 32 respectively, said pipes in turn are connected to boiler 20 and chiller 22 (FIGS. 1, 4, 5 and 7).

A pipe tee 120 is fixed to the upper end of housing 70 and the spent fluid pipe 56 is threaded into it. A closure plug 126 is received into the upper end of the pipe tee 120 and is made fast by means of a spanner wrench (not shown) which can be placed into the pair of holes 128 on its outer side and so provides a sealed closure for the valve housing 70.

The inner side of closure plug 126 has a central positioned cylindrical extension 129 having boltway 130 to receive bolt 132 with nut 134, and the cylindrical extension 129 has 1/16-inch-spaced lines 136 (FIGS. 3 to 5) for the exact vertical adjustable mounting by means of holes 138 in a second temperature responsive transducer 150 which has its lower end fixed to the upper end of the nested valve sleeve 90 so that the temperature changes in the return flow chamber 74 in which the transducer 150 is mounted will result in corresponding rotational movements of the nested valve sleeve 90 and of its port 92.

The operation of the system will now be described. Initially the system is operating in the cooling mode and as the outdoor temperature drops to 68° F, thermostat 41 switches the chiller 22 off, the boiler 20 on, the solenoid valve 26 off and the system is now operating in the heating mode with heating fluid flowing from the boiler 20 through the solenoid valve 26 and into infeed chamber 72 of valve 38 as the temperature of the fluid is changing from 30° F to 180° F and transducer 100, thereby also increasing in temperature, is winding sleeve 76 counterclockwise 150° and the vertical edges of port 86 are approaching their positions as best shown in FIG. 8 and in so doing port 86 is closing bore 106 which, in the cooling mode, was open to pipe 46 and radiator 42 and is opening bore 102 and heating fluid is flowing through pipe 48 and into radiator 44; and likewise, but in return flow chamber 74, the leading edge of port 88 (as it is now rotating counterclockwise) is approaching its fluid flow metering position with respect to port 92 and bore 110, and its following edge is being removed from its cooling mode fluid flow metering position adjacent to bore 114 as best shown in FIG. 7. During the same interval of elapsed time the flow of fluid passing from radiator 44 and going into the return flow chamber 74 of valve 38 is increasing in temperature from 60° F (30° F cooling fluid + 30° F rise) to 150° F (180° F − 30° F drop) giving an increase of the temperature entering the return flow chamber of 90° F and transducer 150 is winding nested sleeve 90 clockwise 90° from its cooling mode position (where port 92 was aligned with bore 114 and was metering the fluid flow of the system and was returning the spent cooling fluid to the chiller 22 via pipe 32) to its heating mode position as shown in FIG. 7 where it is aligned with bore 110 and where it is metering heating fluid flow of the system and where it is returning the spent heating fluid to the boiler 20 via pipe 30.

To afford aid in the description of the operation of the system of valve 38 these several items are noted: transducers 100 and 150 are identical and each provides one degree of motional rotation for each degree F of temperature change of their bi-metal structures; all descriptions of rotative movements are given in clock notations and are viewed from the top of the valve 38 looking downwards; on a temperature increase of the structures of transducers 100 and 150 the lower ends of the transducers will wind clockwise when the upper end is fixed, such as the assembly of the transducer 150 and nested sleeve 90; on a temperature increase of the structures of the transducers the upper ends will wind counterclockwise when the lower ends are fixed such as the assembly of transducer 100 and compound sleeve 76; in an atmosphere of 75° F, which is the relaxation temperature of the transducers 100 and 150, sleeve 76 is fixed onto the end of transducer 100 in the position such that the plane containing the verticle edge areas of port 86 and the longitudinal centerline of housing 70 makes an angle of 45° clockwise with the plane containing the centerlines of rod 98 and housing 70, and so when the temperature of transducer 100 is increased from 75° F to 180° F port 86 will be positioned as shown in FIGS. 4, 5 and 8; and, sleeve 90 is fixed onto one end of transducer 150 and closure plug 126 is fixed onto the other end in a position such that the plane passing through the centers of the pairs of holes 128 and the longitudinal centerline of housing 70 makes a counterclockwise angle of 75° with the plane passing through the verticle diameter of port 92 and the centerline of the housing 70 giving the port 92 the position as shown in FIGS. 4, 5 and 7 when the temperature of the transducer 150 is increased from 75° F to 150° F.

In its operation valve 38 meters the flow of fluid in the system quantitatively (gal/min) and not qualitatively (Btu/gal) and with respect to the needs of area 18 so that the variations of the fluid flow temperatures with respect to time carry into radiator 44 through infeed chamber 72 of valve 38 without change. In the heating mode, for example, data was taken of an American-Standard Model G646 cast iron sectional gas-fired boiler under control of an immersion thermostat operating a solenoid on-off type gas valve with a pilot light for the ignition of the firebox:

| Graph of FIGURE 1 | outdoor temp °F | rise time fire box on | fall time fire box off |
|---|---|---|---|
| Left side | 46 | 8 | 31 |
| Right side | 28 | 12 | 17 |

The hatch lines are the temperature rise lines while the plain lines are the temperature fall lines and the time is in minutes. The dashed horizontal line of the graph is the 180° F hot water design temperature of the system and the peaks of the curves of the graph are the 190° F temperatures of the heated water while the troughs of the curves are the 170° F temperatures. This, then depicts the operation of over 80 percent of conventional hot water boilers. During operation of the system and at random time the temperature at any place from boiler 20 to radiator 44 can be any temperature between 170° and 190° F, and from radiator 44 to boiler 20 between 140° and 160° F, in the heating mode; and likewise in the cooling mode, between 20° and 40° F and 50° and 70° F respectively. The varying temperatures of the fluid flowing through infeed chamber 72 soaks transducer 100 making it wind the compound sleeve 76 with its port 86 in chamber 72 and its port 88 in chamber 74 counterclockwise when the temperature of the fluid flow is increasing and clockwise when the said temperature is decreasing as depicted somewhat by the rise and the fall times shown in the graph of FIG. 1; and moreover, the conversion of heat energy to mechanical energy by the transducer 100 is linear in the temperature range of −100° to +500° F, using Truflex J7 of Metals and Controls Corporation, for example, and is also one degree of rotation of each ° F of temperature change.

The operation of the ports 86 and 88 of valve 38 can be followed by ascertaining the positions of the leading and the following edges of the ports at any temperature of transducer 100 by the use of a protractor placed upon FIG. 8 for the port 86 in chamber 72 and placed upon FIG. 7 for the port 88 in chamber 74, both ports being slaved to transducer 100, and both ports having their edges in the position of 180° F in FIGS. 7 and 8. Placing the protractor upon FIG. 8 it is noted that the leading edge of port 86 can rotate 40° counterclockwise before it begins to close bore 102, whereas, the heating fluid can increase only from 180° to 190° F or 10° F; also, the leading edge of port 86 can rotate 100° clockwise before it begins to close bore 102, whereas, the heating fluid can decrease only to 170° F from the 180° F or 10° F. Now, considering the changeover of the valve 38 with the aid of the protractor, the infeed of 30° F cooling fluid into the heretofore 180° F heating fluid in chamber 72 rotates port 86 clockwise 150° to where the edges of port 86 are aligned normal to rod 98 and with the no-pass part of the port 86 covering bore 102 and with the pass part open to to bore 106. Now, in this position, an increase in the temperature of transducer 100 from 30° to 40° F winds the leading edge of port 86 10° counterclockwise and a protractor gives a reading of 70° before the edge begins to close bore 106; and a decrease in the temperature of 30° to 20° F winds the leading edge of port 86 10° clockwise whereupon a protracror again gives a reading of 70° before the edge begins to close port 106. The operation of valve 38 can then accommodate boilers having a much greater variation in the temperature of the water than the usually accepted design valve of ±10° F.

The edges of port 88, locked as they are to the movements of transducer 100 in chamber 72, transcend chamber separating wall 80 and function in chamber 74 adjusting the metering base to the temperature variations of the flowing fluid in both the heating mode and the cooling mode of the system. Their position when the fluid flowing in chamber 72 is 180° F is as shown in FIG. 7 with one edge bisecting bore 110. When the fluid flowing in chamber 72 is decreasing in temperature during the heating to cooling changeover to 30° F the edges are winding in a clockwise direction 150° to a position where the other edge is bisecting bore 114 as best shown by the use of a protractor. During the same interval of time, and in a like manner to the sleeve 76 but in opposite phase, nested sleeve 90 is being rotated according to the temperature changes of the fluid in chamber 74 and the position of its port 92 when the temperature of the fluid flowing in chamber 74 is at 150° F is as shown in FIG. 7 and in in the spent heating fluid metering with respect to the one edge of port 88 and bore 110. In the heating to cooling changeover of valve 38 the 150° F chamber 74 temperature decreases to 60° F and transducer 150 winds sleeve 90 and its port 92 counterclockwise 90° which aligns port 92 with the other edge of port 88 and the bore 114 as best shown by the use of a protractor.

The descriptions of the foregoing operations were taken in a particular sense to simplify the rudiments of the valve 38, and before going on to the balance of the operations it is important to keep well in mind that the 180° F temperature of the fluid flowing into infeed chamber 72, in the heating mode of the system, represents the average of the everchanging cycle of the temperatures of 170° to 190° to 170° to 190° etc ° F as shown in the graph of FIG. 1; and likewise for the cooling mode of the system where the 30° F is representative of the everchanging cycle of 20° to 40° to 20° to 40° etc ° F; and likewise for the temperatures of the spent fluid flowing into chamber 74 where the 150° F temperature represents the everchanging cycle of 140° to 160° to 140° to 160° etc ° F; and lastly likewise for the 60° F temperature which represents the cycle of 50° to 70° to 50° to 70° etc ° F. Further, it can be ascertained by the use of a protractor that the system mode changeovers, which are in motion by thermostat 41 in accordance with the outdoor temperature which is independent timewise, are all automatic at any of the temperatures defined above and without disturbing the normal fluid flow.

Figures 9, 10:
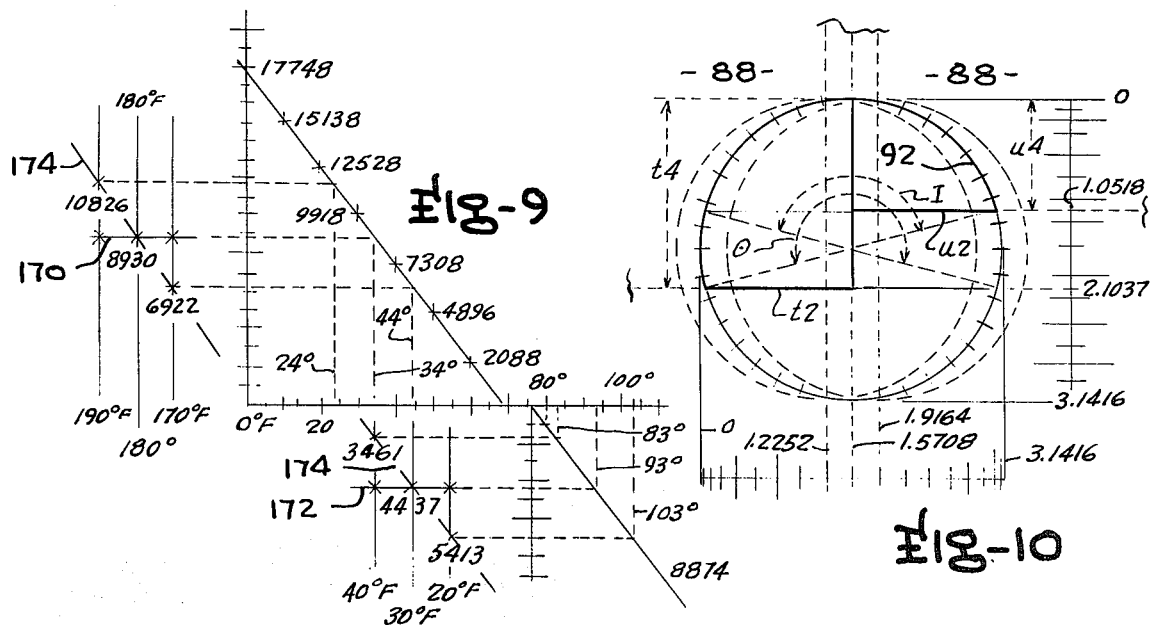
FIG. 9 is a graph depicting the heat losses and gains versus the outdoor temperatures of the area of FIG. 1.
FIG. 10 is a view of a portion of the valve of FIG. 4.

The balance of the description of the operations of the system depicts the manner in which the inventive valve monitors the needs of area 18 and controls the amount of fluid flowing in the system accordingly. In FIG. 1 the needs of area 18 are calculated from the thermal conductivity constants of the materiels of construction of building 19 and the lowest known temperature of its location. The only variable, in the interlink of the outdoors and the area 18 when its temperature is kept at a constant, is the outdoor temperature said outdoor temperature being the abscissa of FIG. 9 and the ordinate is the need of area 18, at 68° F within for the heating mode and 76° f within for the cooling mode, both of these indoor temperatures are attained automatically during operation since they are initiated for each mode whenever the outdoor temperature becomes identical with them (assuming, of course, that thermostat 41 is set at 72°+4°F). and the length of the arc of port 88 has a center angle of 240°. An important operational function of valve 38 to keep in mind is that the vertical edges of port 88 constitute the temperature adjusting seats of port 92. This is the novel feature of the valve in which the non-uniform temperature characteristics of fluids within chamber 72 transcend wall 80 and function in chamber 74 to provide minute and continuous adjustments making it possible for the yet non-uniform temperatures of the fluids in chamber 74 to be metered according to the heat losses of area 18 via the spent fluid from radiators 42 or from radiator 44 and in accordance with the mode of operation of the system. Also, the double interlinks, the area 18 and the radiators 42 and 44 and the valve 38 and the radiators 42 and 44, carry a temperature variable in the form of the circulating fluid. This variable monitors the temperature of area 18 via transducer 150 which in turn and accordingly controls the temperature of area 18 by winding nested valve speed 90 to so adjust and meter the flow rate of the fluid through the system by the action of port 92 and the vertical edges of port 88 to provide equalizing quantity of heat emission from or to the radiators 44 or 42 respectively to satisfy the needs of area 18 at all outdoor temperatures as shown in FIG. 9; for example, the construction and location of building 58 yield a heat loss of area 18 of 17,748 Btu/hr at an outdoor temperature of 0° F and at an area 18 temperature of 68° F. Boiler 20 is set, by means of an immersion thermostat, to fire at 170° F and to extinguish at 190° F; so that the heat emission from the radiator 44 into area 18 varies then accordingly as:

$$150(170-68)^{1.3} \div (170-70)^{1.3} \text{ or } 154 \text{ Btu/sq ft}$$
$$150(180-68)^{1.3} \div (170-70)^{1.3} \text{ or } 174 \text{ Btu/sq ft}$$
$$150(190-68)^{1.3} \div (170-70)^{1.3} \text{ or } 194 \text{ Btu/sq ft}$$

and the size of radiator 44 is 17,784 ÷ 174 or 102 sq. ft. of radiation (EDR). The greatest amount of heating that will be needed is 17,748 ÷ 1800 or 9.86 lbs/min of water at the above changing temperatures, and a port area of 0.2333 sq. ins. at a flow velocity of 1.7 ft/sec will meet this need, as shown in FIG. 9; and in this manner, calculations for each ten degrees of outdoor temperature have been made to complete the heating mode, the cooling mode and the quiescent mode of the system.

After the valve 38 has been fixed into the physical parts of the system, a shelf stocked package containing a mating pair of transducer assemblies is selected to fit the system. The transducer assembly having the sleeve 76 is first placed within the housing 70 and then its mate, the transducer assembly with the sleeve 90 is inserted into the housing and the closure plug 126 is screwed into the pipe tee 120 to complete the installation.

It would be most unusual to find that the heat loss of area 18 would be such a value that a pair of factory transducer assemblies would fit exactly; and moreover, good engineering practice calls for the selection of the larger size when the need falls between two sizes. The adjustment which provides for the use of a larger size is best described by FIGS. 3 and 4 and TABLE 1 below wherein the values of the parameter and the variables of the inventive value 38 have been calculated and entered:

TABLE 1

|   | Central Angle 1 | Unit Circle 2 | Port Area 3 | Inch 4 | Heating Mode Area 5 | Heating Mode Btu 6 | Heating Mode Lbs 7 | Cooling Mode Area 8 | Cooling Mode Btu 9 | Cooling Mode Lbs 10 |
|---|---|---|---|---|---|---|---|---|---|---|
| a | 0 | 0 | 0 | 0 | 0 | 0 | 0 | 0 | 0 | 0 |
| b | 20 | .0035 | .0003 | .005 | .0003 | 20 | .011 | .0001 | 10 | .006 |
| c | 40 | .0277 | .0031 | .020 | .0021 | 157 | .087 | .0010 | 78 | .044 |
| d | 60 | .0906 | .0100 | .045 | .0067 | 512 | .248 | .0034 | 256 | .142 |
| e | 80 | .2057 | .0228 | .078 | .0153 | 1162 | .646 | .0076 | 581 | .323 |
| f | 100 | .3803 | .0422 | .119 | .0283 | 2148 | 1.194 | .0141 | 1074 | .579 |
| g | 120 | .6142 | .0681 | .167 | .0456 | 3470 | 1.923 | .0228 | 1735 | .964 |
| h | 140 | .9003 | .0998 | .219 | .0669 | 5086 | 2.826 | .0336 | 2543 | 1.413 |
| i | 160 | 1.2252 | .1359 | .272 | .0910 | 6922 | 3.845 | .0455 | 3461 | 1.923 |
| j | 180 | 1.5708 | .1742 | .333 | .1167 | 8930 | 4.930 | .0584 | 4437 | 2.465 |
| k | 200 | 1.9164 | .3914 | .391 | .1424 | 10826 | 6.015 | .0712 | 5413 | 3.007 |
| l | 220 | 2.2413 | .2486 | .448 | .1665 | 12662 | 7.034 | .0833 | 6331 | 3.517 |
| m | 240 | 2.5274 | .2803 | .500 | .1877 | 14278 | 7.920 | .0939 | 7139 | 3.966 |

TABLE 1-continued

| Central angle | Unit Circle | Port Area | Inch | Heating Mode | | | Cooling Mode | | |
|---|---|---|---|---|---|---|---|---|---|
| 1 | 2 | 3 | 4 | Area 5 | Btu 6 | Lbs 7 | Area 8 | Btu 9 | Lbs 10 |
| 260 | 2.7613 | .3062 | .548 | .2051 | 15600 | 8.666 | .1026 | 7800 | 4.333 |
| 280 | 2.9359 | .3256 | .588 | .2180 | 16586 | 9.214 | .1091 | 8293 | 4.607 |
| 300 | 3.0510 | .3384 | .622 | .2266 | 17236 | 9.576 | .1133 | 8618 | 4.788 |
| 320 | 3.1139 | .3453 | .646 | .2312 | 17591 | 9.773 | .1157 | 8796 | 4.887 |
| 340 | 3.1381 | .3480 | .661 | .2330 | 17728 | 9.849 | .1166 | 8864 | 4.925 |
| 360 | 3.1416 | .3484 | .666 | .2333 | 17748 | 9.860 | .1167 | 8874 | 4.930 |
| 211 | 2.1037 | .2333 | .421 | 1563 | 11885 | 6.603 | | | |
| 50 | .0518 | .167 | .223 | | | | .0391 | 2971 | 1.651 |

In TABLE 1, the areas given in column 2 are dependent on the central angles of column 1, in a manner that port 92 of FIG. 10, when taken as a unit circle is partible into sized areas according to the chords subtended by the arcs of the central angles of the unit circle. The values of these areas are entered accordingly in column 2 for a unit circle of 1 in radius; in column 3 for the above selected package of the mated transducers having a port 92 radius of 0.333 ins; in column 5 for the adjusted port area to exactly fit area 18 heating needs; and, in column 8 for the area to exactly fit area 18 cooling needs.

The position, or location, of a central angle of zero degrees for columns 2, 3 and 4 is the top end of the vertical diameter of port 92 and so the areas of columns 2 and 3 and the distances of column 4 are those above the chords subtended by the arcs of the central angles. The location of a central angle of zero degrees for columns 5 and 8 is the left end of the horizontal diameter of port 92 and so the areas of columns 5 and 8 are to the left of the chords subtended by the arcs of the central angles. The values in columns 6 and 9 are in Btu/hr and the values in columns 7 and 10 lbs/min of water flowing through the ½-inch copper pipe 30 attached to bore 110 in the heating mode at a velocity of 1.7 ft/sec; and likewise, through pipe 32 attached to bore 114 in the cooling mode at a velocity of 0.85 ft/sec; for full open flows.

Moreover, the circle of FIG. 10 (port 92) is the full flow area of valve 38, and can be adjusted by moving the clamped position of bolt 132 within boltway 130 upwards or downwards to fit the valve 38 to a particular use. In this way the nested sleeve valve 90 is lowered into valve sleeve 76, from its position where port 92 is in full register with port 88 to that position where the lower peripheral edge of port 88 subtends a chord across the lower portion of port 92 below which there can be no fluid flow. The amount of this adjustment is i4 of TABLE 1 and is 0.4213 inches which places the top edge of transducer 150 on the 6.74th 1/16-inch spaced scribed line of lines 136 as shown in FIG. 4. The values of line t in TABLE 1 are gotten by the division of the full flow adjusted port 92 area (0.2333 sq ins) s5 by the square of the radius of the port of the selected ¾-inch package as above or 0.1109 giving the numeral 2.1037 from which the other values of line t are known. The area 0.3438 of s3 is divided by pi to give 0.1109. Referring now to FIG. 10, the lower peripheral edge of port 88 lies upon the chord t2 above which is the areas 2.1037 of the unit circle, 0.2333 of the port 92 of the selected assembly, and 0.1563 of the port 92 of the adjusted selected assembly. The chord t2 is subtended by the arc of the central angle θ which is 211°.

To better survey one of the above described novel features of the inventive valve 38 concerning the edges of port 88 being the temperature adjusting valving seats of port 92 which prohibit or prevent the temperature variations of the fluid from boiler 20, for example, to enter area 18 by radiator 44 in the form heat emission variations. As calculated above, these heat emission variations cause an energy differential of 40 Btu/sq ft of radiation for the temperature scan of 170° to 190° to 170° F, which is negated or cancelled in the following manner. FIGS. 4 and 10 show the same view of ports 88 and 92 in which the heating edge of port 88 is in the position that it has when the temperature of the fluid in chamber 72 is 180° F wherein said edge overlies the vertical diameter of port 92 (FIG. 10); and wherein, the flow-through-area of ports 88 and 92 in chamber 74 is 0.1167 sq ins as is noted by j5 of TABLE 1. Likewise, when the temperature of the fluid in chamber 72 has increased to 190° F the heating edge of port 88 has moved left to the position where it overlies chord 1.2252 (FIG. 10); and the flow-through-area has lessened to 0.0910 sq ins. And again likewise, when the temperature of the fluid in chamber 72 has decreased to 170° F the heating edge of port 88 has moved right to the position where it overlies chord 0.9164 (FIG. 10); and, the flow-through-area has increased to 0.1424 sq ins as is noted by k5 of TABLE 1; and so the differential of the area of port 92 is 0.05-sq ins making the fluid flow differential 2.17 lbs ($k7 - i7$) in the closed fluid path of the hydraulic circuit of the system. The fluid flow velocity of 1.7 ft/sec in the ½-inch copper tubes 30 and 32 aligned as they are with the bores 110 and 114 respectively and all having like internal diameters set the values for TABLE 1. When the fluid is in motion, sleeve 90 becomes a reservoir from which port 92 acts as a submerged tube for the discharge of the fluid. When sleeve 90 has a 1/16-inch wall thickness the coefficient of discharge of port 92 is found to be 0.94 from Table 4–10 on page 4–35 of the "Handbook of Hydraulics" by King and Brater, Fifth Edition, since the L/p of port is 0.0625 divided by 1.3848 or 0.0451 where p is the perimeter of the flow-through-area (the full lines and the arc between them of FIG. 10). The fluid flow energy differential created then by valve 38 is 2.17 × .94 × 20 or 40.8 Btu to balance out the 40 Btu emission energy differential above and the 0.8 Btu will remain in the fluid flow circuit and be a part of the metering function of the port 92.

FIG. 9 also gives a comparison of the inventive system and a system without the automatic temperature adjusting seats of the valve 38 such as a system of the related Patents which do not have this feature; said comparison being shown to the left of the ordinates of the heating and the cooling graphs, however connected to them in order to read out the Btu values of the compared systems in terms of the outdoor temperatures; wherein, line 170 in the heating mode and line 172 in the cooling mode are of the inventive system and line 174 in the heating mode and line 176 in the cooling mode are of any such system but without the inventive valve 38; and in this respect, to again examine FIG. 10, spaced marker dash lines are placed around the circumference on the circle of port 92 to represent the rotation of port 88 in relation to the central angles of column 1 of TABLE 1, each marker dash line representing a rotation of 10°. In other words, the plane of the marker dash lines is tilted about the horizontal diameter of port 92 ninty degrees and is viewed from the top to see port 88 rotations, however, a carbon copy of the plane has remained in the original position to give or indicate corresponding central angles with each 10° marker dash line being a 20° central angle, as in TABLE 2 below:

TABLE 2

| Central Angle | Heating Mode | | | Cooling Mode | | |
|---|---|---|---|---|---|---|
| | Angle 88 | Area | Btu/hr | Angle 88 | Area | Btu/hr |
| 160 | 190 | .0910 | 6922 | 20 | .0455 | 3461 |
| 180 | 180 | .1167 | 8930 | 30 | .0584 | 4437 |
| 200 | 170 | .1424 | 10826 | 40 | .0712 | 5413 |
| 360 | * | .2333 | 17748 | ** | .1167 | 8874 |

*Angles less than 170 or greater than 190 do not exist.
**Angles greater than 40 or less than 20 do not exist As shown in TABLE 2, the angles of rotation of port 88 in both of the modes of operation are restricted in their scans and limits their shuttleing motions to the vertical chord 1.2252 to the left of the vertical diameter of port 92 and to the chord 1.9164 to its right, (FIG. 10). These chords are connected topside by the arc and bottomside by the horizontal chord 2.1037 in the heating mode and by the horizontal chord 1.1508 in the cooling mode. The vertical chord 1.2252 is the limit to which the vertical heating edge of port 88 can rotate counterclockwise (move to the left in FIG. 10) as the temperature of the fluid in chamber 72 increases to its maximum of 190° F and the vertical chord 1.9164 is the limit to which said edge of port 88 can rotate clockwise (move to the right in FIG. 10) as the temperature of the fluid in chamber 72 decreases to its minimum of 170° F. In this manner the heating edge of port 88 oscillates ±10° from the vertical diameter of bore 110 throughout the heating mode. Port 92, however, having no rotational limits rotates clockwise (move right in FIG. 10) when the temperature of the fluid in chamber 74 increases and rotates counterclockwise (move left in FIG. 10) when the fluid in chamber 74 decreases and in this manner scans its entire range of areas by means of the slowly oscillating vertical heating edge of port 88. Arithmetically, and counting increments of angular minutes of ports 88 and 92 there are, according to TABLES 1 and 2, 25,920,000 discrete sq in areas for the control or regulation of the needs of area 18, between the open and closed positions of ports 88 and 92; and it very well may be a smooth process of control since all of the angles of operation of the ports are provided within the temperature stressed ranges of the transducers 100 and 150.

The cooling mode of the system, being hydronic, is a departure, somewhat, from the air conditioning systems in general use at this time; however, it offers many advantages over the present cooling systems such as eliminating the air ducts which make for dusty, drafty and ororous atmospheres within area and which also bring noise of the fan or blower into the areas which are being cooled, and better control, less maintenance, increased economy of operation and less expensive to install when used with the inventive heating and cooling systems. Perhaps, one of the most important advantageous features is that hydronic systems do not spread fires from one area to another such as up the ducts in a high rise building.

The operation of the cooling has been covered in some respects heretofore, and it differs little from that of the heating mode since the specific heat of water (Btu/[lb][°F]) at 30° F is 1.009 and at 180° F is 1.003 and so no adjustments need to be made in the system in this respect. The emission from radiator 42 for each sq ft of radiation is;

$$150(68-40)^{1.3} \div (170-70)^{1.3} \text{ or } 29 \text{ Btu/sq ft}$$
$$150(68-30)^{1.3} \div (170-70)^{1.3} \text{ or } 43 \text{ \textit{''}}$$
$$150(68-20)^{1.3} \div (170-70)^{1.3} \text{ or } 57 \text{ \textit{''}}$$

and from FIG. 9, the greatest need for cooling is 8874 Btu/hr so that the size of radiator 42 is 8874÷43 or 206 sq ft of radiation (EDR), and the greatest amount of cooling water that will be needed for an outdoor temperature of 110° F is 8874÷1800 or 4.93 lbs/min at the average radiator temperature of 30° F. FIG. 10 displays the relative positions of the ports 88 and 92 in both of the heating and cooling modes and port 92 is divided into equal parts by the vertical chord 1.5708 whenever the temperature of the fluid in chamber 72 is 180° or 30° F and the temperature of the fluid in chamber 74 is 150° or 60° F respectively; and of course, in these instances the chord 1.5708 overlies the vertical diameter of port 92 and the chord is a projection of the vertical diameter of bore 110 in the heating mode and of bore 114 in the cooling mode and the chord also overlies the heating edge of port 88 which has its flow-through section to the left of the the chord and this same chord also overlies the cooling edge of port 88 which has has its flow-through section to the right of chord 1.5708, it being understood that in the heating mode FIG. 10 is aligned with bore 110 and in the cooling mode it is in alignment with bore 114.

The full-open-flow-through area of the heating mode is the area above the chord 2.1037 and within the arc subtended by the central angle Theta ($\theta$) which is 211°. The full-open-flow-through area of the cooling mode is the area above chord 1.0518 and within the arc subtended by the central angle Iota (I) which is 150°. TABLE 2 gives the oscillational limits of the edges of port 88 for both modes of the system and the limits of these oscillations are fixed as to the depth (20°) and positions of their limiting chords with respect to the vertical diameter of bore 110 in the heating mode and to bore 114 in the cooling mode. When the selected transducer assemblies were sized to the needs of area 18 in the heating mode by the positioning of bolt 132 a distance of $t4$ downward by boltway 130, they were also sized for the cooling mode by aa distance $u4$ by means of the lesser vertical height of port 88 along the lower periphery fluid pass section for one-half of the peripheral length of the port 88, as best shown in the cross sectional FIG. 5 where on the right side of sleeve 76 the height is cut to equal the diameter of port 92 and of incidence the bore diameter 110, where on the left side the height is cut to a lesser amount as shown in TABLE 2 on the 360° central angle line; and on the changeovers of the heating mode to the cooling mode and vice-versa the resizing is automatic and immediate.

Using the inventive valve in a dry climate during the cooling season an outdoor temperature of 80° F is comfortable and so the thermostat 41 of the system might well be set to the temperature range of 68° to 80° F by setting the temperature control to 74° F and the differential control to ±6° thus enlarging the quiescent zone of the system and saving more energy; and this doesn't effect the sizing of the valve 38.

The second or alternative embodiment of the valve 38 is illustrated in FIGS. 11–15 to which reference is now made for the following discussion thereof. It is initially noted that the only difference between the second valve and the first valve is in the manner by which the upper end of the transducer 150 is supported for axial and rotational adjustment. More specifically, a threaded ring mounting element 200 is received into the pipe tee 120 and includes a central aperture 202 being axial and through which an axial cylindrical portion 204 of a rotary adjustment knob 206, having marker line 207 for alignment with temperature scale 208 which is on pipe tee 120, extends. A hexagonal socket sleeve screw 210 having an axial bore 211 extends downwardly through the axial opening in the knob 206 and has its lower end threadably connected with a retaining disc 212 which permits the knob 206 to rotate about its axis.

A hexagonal socket cap screw 214 extends downwardly in the axial bore 211 in the sleeve screw 210 and has its lower end threadably connected to a support disc 216 fixedly connected to the upper end of the transducer 150 for providing support thereof. A keeper ring 215 mounted in a radial slot at the base of the hexagonal opening in the head of sleeve screw 210 prevents upward movement of cap screw 214 in bore 211 in an obvious manner.

A pair of cylindrical rod members 218 have their lower ends fixedly mounted in support disc 216 and extend upwardly through arcuate slots 220 formed in the retaining disc 212 for permitting limited relative rotation of the upper end of the transducer 150 with respect to the disc 212. The upper ends of the rods 218 are slidably and matingly received in the openings 222 in the bottom of knob member 206. It is consequently possible to rotate the knob member 206 to provide resultant rotational positioning, according to the temperature scale 208, of transducer 150 and attached nested sleeve 90. Moreover the nested sleeve 90 can be raised or lowered, to size the valve 38 to a particular use, without the removal of any of the parts of the valve by turning the hexagonal socket cap screw 214.

Therefore, it will be seen that the second embodiment of the invention provides for an easy external adjustment of all valve parameters without disturbing the fluid flow or any other parts of the system and without disassembly of the valve as is required of the tamper-proof first embodiment; additionally, it will be obvious that the valve of the first embodiment is fully interchangeable with the valve of the second embodiment, and vice-versa, and that the exchange can be accomplished without changes of any of the pipe connections of the valve.

A simple control valve 38 can be used to supply a number of cooling and heating radiators in different areas of a building by introducing branches in the pipe lines 46, 48 and 56 of FIG. 1, (not shown). Moreover, the same energy sources as boiler 20 and chiller 22 can supply more than one control valve 38 through the branching of supply pipe 40 and the branching of the spent fluid lines 30 and 32 to boiler 20 and chiller 22 respectively in an obvious manner (also not shown).

Another innovation to the inventive valve and system is shown in FIGS. 16 and 17 and enables the valve to be used with systems of higher fluid pressures. A two-stage bore 226 through chamber separating wall 80 of the compound valve sleeve 76 accommodates the reverse two-stage cover 228 which is held in place by cantilever tensed spring 230 one end of which is fastened to the wall 80 by rivet 232 or such and having channel 234 on its other end to hold bolt 236 which is screwed into centrally located tapped hole 238 in cover 228. During operation, should the pressure in chamber be higher than that for the proper operation of valve 38, the forces acting downward for the tensed spring 230 and the weight of the cover 228 will be overcome by the forces acting upwards due to the pressure of the fluid in the chamber 72 upon the area of the underside of cover 228 causing the cover to be lifted to allow for some of the fluid to pass through bore 226 and flow directly via pipe back to boiler 20 in the heating mode (FIG. 1) and directly back via pipe 32 to chiller 22 in the cooling mode of the system.

Figure 18:
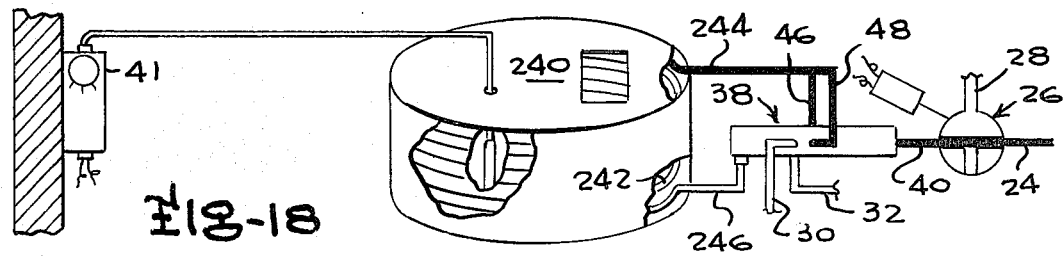
FIG. 18 is a schematic pictorial illustration of the use of the invention in an industrial platecoil tank.

FIG. 18 illustrates the manner in which the inventive valve 38 can be associated with an industrial process such as the temperature controlled platecoil type vessel 240. The remote bulb of thermostat 41 senses the needs of the system by its close proximity to the reactants and controls three-way solenoid valve 26 to admit heating fluid via pipe 24 or cooling fluid available through pipe 28 and into the inventive valve 38 via pipe 40; and, the fluid enters chamber 72 and adjusts the temperature floating edges of port 88 within chamber 74 and then is directed through bore 102 and pipe 48 or bore 106 and pipe 46 to platecoil 242 via pipe 244. The spent fluid enters chamber 74 of valve 38 through pipe 246 and meters the fluid flow according to the temperature of the fluid in chamber 74 and by the temperature set (the alignment of marker line 207 of rotatable knob 206 to the scale 208 as shown in FIG. 11) all in the manner as heretofore described. The spent heating fluid is returned to the boiler 20 via pipe 30 and the spent cooling fluid is returned to the chiller via pipe 32 being directed in this manner by the valve 38 (the boiler and the chiller and the pipes to and from them are not shown).

Energy in the form of heat can be transferred to or from the contents of the process vessel as needs arise automatically and without human monitoring; for example and in manufacturing, when a good thermal contact of a quenching medium (such as an oil or water) is made with the vessel coil 242, by a stirrer (not shown) the inventive valve 38 maintains the quenching medium at a suitable temperature regardless of the number of items treated per unit of time or the duration of their heat treatment; and for another example, the valve 38 can be used to control the temperature of chemical reactants whether the energy of activation is endothermic or exothermic or both during a sumwhat small interval of time and without the resetting of the thermostat 41.

To further enhance the useage of the inventive valve 38, the four pipe system and the radiators 42 and 44 of FIG. 1 can be replaced by a heating-cooling hydronic valence unit which is available as a commercial item in sizes up to 2800 Btu/hr/linear foot complete with mounting hardware, condensate removal and also with engineering data for architects who give their clientele the best of indoor environments for their home, work and play and for their advancement and recuperation of body, mind and soul.

The third or alternate embodiment of the inventive valve 38 is illustrated in FIG. 19 to which reference is now made for the following discussion thereof. It is noted, initially, that the only difference between the third valve and the first valve is the manner in which the upper end of the transducer 150 is supported for axial alignment and the manner in which the closure plug 126 becomes a corrective function of the infeed fluid temperature by the selective thickness of a washer, and also the manner in which the third valve can be adjusted to fit a particular use and the way that the temperature of area 18 can be changed. More specifically, transducer 150 is fixed to cylindrical member 250 which has an axial threaded bore 252 into which hexagon socket cap screw 254 is threaded. The head of cap screw 254 is received into the threaded partial bore 256, centrally located on the inner side of closure plug 126, and is held therein except for rotational purposes by threaded ring element 258. Bore 260 communicates axially with bore 256 but more essentially with cap screw 254. A rod 262 has its upper end fixedly mounted into the inner side of closure plug 126 and extends downwards through bore 263 of cylindrical member 250 to prevent relative motion of the upper end of transducer 150 with respect to closure plug 126 but allowing the lower parts of rod 262 to be slidable and matingly received in the bore 263. Closure plug 126 can now be rotated to provide resultant rotational positioning, of the top of transducer 150, but or more importance, the consequent positioning of the vertical diameter of port 92 so that it ovrlies the vertical edges of the port 88 for any selected average or design temperatures of the fluids of the boiler 20 or the chiller 22. Returning now to TABLE 2 (which has only one average of design angle for port 88, 180 and 30) this new positional parameter, the means of the insertion of a coded washer, can adjust valve 38 for an angle 88 corresponding to any central angle and give it (valve 38) complete versatility to operate with any hydronic heating and/or cooling system. The 20 degree span ($\pm 10°$ from the design or average fluid temperature) has become standard in order to protect the boiler and the chiller and their controls from undue wear. The coded washer 266 of FIG. 19 and its thickness as at 264 can be coded one each for every 2° of rotational position of port 92 covering the inflowing average of design fluid temperatures of 160° to 200° F. The washer of the proper thickness is inserted during the installation of the valve and whenever the temperature of the infeed fluid to chamber 72 is known.

The third valve, also a tamper-proof model, is adjusted for a particular use by inserting a hexagonal socket cap screw wrench through bore 260 in order to engage cap screw 254 and to turn it, clockwise to increase the fluid flow and counterclockwise to decrease the fluid flow through the valve 38 and the system. FIG. 19 shows cylindrical member 250 in its uppermost position and against the inner surface of closure plug 126 which is the full open position of port 92 of the valve 38, third embodiment thereof, and wherein the cap screw cannot be turned more clockwise. By the use of a standard U.S. Fine No. 28 cap screw one complete turn of it will lower or raise the port 92 1/28th or 0.0357 inches and so to size the third valve for the area 18, the extrapolated line $t$ of TABLE 1 is used to find the distance $t4$ and as shown in FIG. 10 of 0.421 inches. Now, turning cap screw 254 clockwise to its dead end and then turning it counterclockwise the distance of 0.421 inches which is 0.421/0.0357 or 11.8 turns which will size the third valve 38 exactly to the needs of the area 18.

And, in addition, cap screw 254 can be used to change the temperature of the area 18. While in the second embodiment of the valve 38 the temperature of the area 18 was changed by a bit of rotation of knob 206 which, for a given temperature of spent fluid in the chamber 74, provided a greater or a lesser fluid flow through the ports 88 and 92 dependent upon the direction of the rotation of the knob 206; whereas, in the third embodiment of the valve 38 the same fluid flow actions are accomplished with axial movements of port 92 with rspect to port 88 by the turning of the cap screw 254. For example: From FIG. 9, a one degree difference in outdoor temperature causes a difference of 261 Btu/hr and since the calculations are based upon the difference of the outdoor and indoor temperatures, a one degree difference in indoor temperature is also a difference of 261 Btu/hr. It takes 46 Btu to raise the temperature of the 2434 cu ft of space in area 18 1° F. From the heretofore calculated emission values of heated water a rise in the indoor temperature of 1° F creates an emission loss of 2 Btu/hr/sq ft or a total of 204 Btu/hr. These three items add up to 511 Btu/hr. From TABLE 1, extrapolation of the values of line $t$ in the columns 4 and 6 give $-(11,885 + 511)/11,885 = 1.04$ and $0.421x\ 1.04 = 0.439$ and $0.439 - 0.421 = 0.018$ and $0.018/0.0357 = 0.5042$ so that one half turn clockwise of the cap screw 254 is needed to raise the temperature of the area 18 1°F. Likewise one half turn of the cap screw 254 counterclockwise will decrease the area 18 temperature by 1° F; and, in the cooling mode of the operation, because of the larger radiation unit and the condensate, a full turn of the cap screw 254 for each ° F change in the temperature of the area 18 is necessary.

While several embodiments of the invention have been disclosed in conjunction with various specific heating and cooling systems, it should be understood that the spirit and the scope of the invention is not limited to the structural details shown herein and is to be limited solely by the appended claims.

I claim:

1. An automatic cooling and heating system for providing temperature control for an enclosed control area, said system comprising a source of heated work fluid, a source of chilled work fluid, a heating heat exchanger in said control area, a cooling heat exchanger in said control area, said heating heat exchanger and said cooling heat exchanger both including a work fluid inlet and a work fluid exhaust, a temperature responsive control valve including a hollow valve housing, a first cylindrical valve sleeve mounted for axial rotation in said valve housing and having first and second open-ended internal sleeve chambers on each end separated by a transverse internal wall, said first cylindrical valve sleeve separating the interior of said hollow valve into first and second flow control chambers, a nested cylindrical valve sleeve matingly received within said second internal sleeve chamber of said first valve sleeve for axial rotation therein with respect to said first valve sleeve and said housing, a main supply inlet port in said valve housing communicating with said first flow chamber, selectively operable low control means including conduit means and solenoid valve means alternatively providing communication between said main supply fluid inlet port and said source of hot work fluid or said source of chilled work fluid, a hot supply outlet port in said valve housing communicating with said first flow control chamber and connected to a supply pipe extending to the work fluid supply inlet of said heating heat exchanger, a cold supply outlet port in said valve housing communicating with said first flow control chamber and connected to a cold fluid supply pipe extending to the work fluid inlet of said cooling heat exchanger, a spent fluid return in said valve housing communicating with said second flow control chamber and connected to conduit means connected to the work fluid exhaust of both said cooling heat exchanger and heating heat exchanger, a hot feed return port in said housing communicating with said second flow chamber and connected by conduit means to a feed inlet on said source of hot work fluid, a main supply sleeve port in said first internal chamber of said first cylindrical valve sleeve, said main supply sleeve port being alternatively alignable with said hot supply outlet port or said cold supply outlet port by rotation of said first cylindrical valve sleeve in said valve housing, a chiller fed return port on said housing communicating with said second chamber and connected by conduit means to an infeed inlet on said source of chilled work fluid, a spent fluid return sleeve port in said second internal chamber of said cylindrical valve sleeve, a first control means responsive to the temperature of work fluid in said first flow control chamber for positioning said first cylindrical valve sleeve in a heat mode position to align said main supply sleeve port with said hot supply outlet port and to simultaneously align said spent fluid return sleeve port with said hot feed return port in said housing when the temperature of fluid in said first flow chamber exceeds a first predetermined value and for positioning said first valve sleeve in a cooling mode position in which said main supply sleeve port is in alignment with said cold supply sleeve port in said housing and said spent fluid return sleeve port is in alignment with said chiller feed return port when the temperature in said first flow chamber is less than a predetermined second temperature, a flow modulating sleeve port in said nested cylindrical valve sleeve rotationally positionable in varying degrees of alignment with said spent fluid return sleeve port, a second control means connected to said nested cylindrical valve sleeve responsive to the temperature of fluid in said second flow chamber for positioning said flow modulating sleeve port with respect to said spent fluid return sleeve port for adjusting the degree of alignment between said flow modulating sleeve port and said spent fluid return sleeve port in accordance with the temperature in said second chamber for controlling flow through the system to maintain a desired temperature in said control area.

2. The invention of claim 1 wherein said first control means responsive to the temperature or work fluid in said first flow control chamber for positioning said first cylindrical valve sleeve comprises an elongated bimetallic coil spring member having first and second ends and connected on said first end to said first cylindrical valve sleeve and additionally including support means mounted on said valve housing and supportingly engaging said second end of said bimetallic coil spring member.

3. The invention of claim 1 wherein said first control means responsive to the temperature of work fluid in said first flow control chamber for positioning said first cylindrical valve sleeve comprises a first elongated bimetallic coil spring member having first and second ends and connected on said first end to said first cylindrical valve sleeve and connected on said second end to said valve housing by first coil support means adjacent one end of said valve housing, said second control means responsive to the temmperature of fluid in said second flow chamber comprises a second elongated bimetallic coil having first and second ends with said first end of said second elongated bimetallic coil being connected to said nested cylindrical valve sleeve and additionally including second coil support means mounted on a second end of said valve housing opposite the end of said valve housing to which said first elongated bimetallic coil spring is connected and supportingly engaging said second end of said second elongated bimetallic coil spring.

4. The invention of claim 1 wherein said first control means responsible to the temperature of work fluid in said first flow control chamber for positioning said first cylindrical valve sleeve comprises a first elongated bimetallic coil spring member having first and second ends and connected on said first end to said first cylindrical valve sleeve and connected on said second end to said valve housing by first coil support means adjacent one end of said valve housing, said second control means responsive to the temperature of the fluid in said second flow chamber comprises a second elongated bimetallic coil having first and second ends with said first end of said second elongated bimetallic coil being connected to said nested cylindrical valve sleeve and additionally including the second coil support means mounted on a second end of said valve housing opposite the end of said valve housing to which first elongated bimetallic coil spring is connected and adjustably supportingly engaging said second end of said second elongated coil spring or permitting selective axial positioning of said nested cylindrical valve sleeve with respect to said first cylindrical valve sleeve.

5. The invention of claim 4 wherein said second coil support means includes a series of flat ring washers, each such washer having a coded singular thickness from which series the selection of a particular washer to be installed into the inventive valve will enable said second end of said second elongated coil spring to be positioned for providing a selective rotational adjustment of said second elongated bimetallic coil and said nested cylindrical sleeve valve with respect to a particular rotational position of the said first cylindrical valve sleeve.

6. The invention of claim 5 wherein said fitting support additionally includes axial adjustment of said second elongated bimetallic coil and said second nested cylindrical valve sleeve with respect to the first cylindrical valve sleeve for enabling an adjustment of the flow capacity of the said valve and also for enabling an adjustment of the said valve so as to control an area or a process at a greater or a lesser selected temperature. Such axial adjustment, as opposed to the adjustment of claim 5, being made posterior of the installation of the said valve and being made as needed during the operation of the said valve and being made from the exterior surface of the housing of the said valve, only with the aid of a selected tool. The variations of the said axial adjustment being infinite between the full open flow and the closed positions of the said valve.

7. The invention of claim 4 wherein said second coil support means includes a support disc fixedly connected to the second end of said second elongated bimetallic coil member, a threaded ring mounting element threadably received in said second end of said valve housing, an axial opening extending through said threaded ring mounting element, manually adjustable knob means mounted for rotation in said axial opening in said ring mounting element, an axial passageway extending the length of said knob means, a socket sleeve screw extending through said axial passageway in said knob means and having a lower threaded end portion, said socket screw sleeve additionally including an axial passageway extending along its length, retaining disc means threadably connected to the lower end of said socket sleeve screw for maintaining said manual knob means and said socket screw sleeve inmounted relationship capable of axial rotation on threaded ring mounting element, cap screw means extending extending through said axial passageway in said socket sleeve screw and having a lower end threadably received in said support disc fixedly connected to said second end of second elongated bimetallic coil member where by rotation of said cap screw provides axial adjustment of said second elongated bimetallic coil spring member and first and second cylindrical rod members having lower ends fixedly mounted in daid support disc and extending in parallel manner upwardly through arcuate slot means formed in said retaining disc, the upper ends of said first ans second cylindrical rod members having received in mating aperatures in said knob member, so that rotation of said knob member effects rotational adjustment of said rod members, said support disc and said second elongated bimetallic coil spring.

8. Valve means for use for providing automatic temperature control for an enclosed control area by providing a controlled flow of work fluid from a source of heated work fluid or a source of chilled work fluid through heat exchange means in said control area, said valve including a hollow valve housing, a first cylindrical valve sleeve mounted for axial rotation in said valve housing and having first and second open-ended internal sleeve chambers n each end separated by a transverse internal wall, said first cylindrical valve sleeve separating the interior of said hollow valve housing into first and second flow control chambers, a nested cylindrical valve sleeve matingly received within said second internal sleeve chamber of said first valve sleeve for axial rotation therein with respect to said first valve sleeve and said housing, a main supply fluid inlet port in said valve housing communicating with said first flow chamber, a hot supply outlet port in said valve housing communicating with said first flow control chamber, a cold supply outlet port in said valve housing communicating with said first flow control chamber, a spent fluid return port in said valve housing communicating with said second flow control chamber, a hot feed return port in said housing communicating with said second flow chamber, a main supply sleeve port in said first internal chamber of said first cylindrical valve sleeve, said main supply sleeve port being alternatively alignable with said hot supply outlet port or said cold supply outlet port by rotation of said first cylindrical valve sleeve in said valve housing, a chiller feed return port on said housing communicating with said second chamber, a spent fluid return sleeve port in second internal chamber of said cylindrical valve sleeve, a first control means responsive to the temperature in said first flow control chamber for positioning said first cylindrical valve sleeve in a heat mode position to align said main supply sleeve port with said hot supply outlet port and to simultaneously align said spent fluid return sleeve port with said hot feed return port in said housing when the temperature in said first flow chamber exceeds a first predetermined value and for positioning said first valve sleeve in a cooling mode position in which said main supply sleeve port is in alignment with said cold supply port in said housing and said spent fluid return sleeve port is in alignment with said chiller feed return port when the temperature in said first flow chamber is less than a predetermined second temperature, a flow modulating sleeve port in said nested cylindrical valve sleeve rotationally positionable in varying degrees of alignment with said spent fluid return sleeve port and a second control means connected to said nested cylindrical valve sleeve responsive to the temperature in said second flow chamber for positioning said flow modulating sleeve port with respect to said spent fluid return sleeve port for adjusting the degree of alignment between said flow modulating sleeve port and said spent fluid return sleeve port in accordance with the temperature in said second flow chamber.

9. The invention of claim 8 wherein said first control means responsive to the temperature in said first flow control chamber for positioning said first cylindrical valve sleeve comprises an elongated bimetallic coil spring member having first and second ends and connected on said first end to said first cylindrical valve sleeve and additionally including support means mounted on said valve housing and supportingly engaging said second end of said bimetallic coil spring member.

10. The invention of claim 8 wherein said first control means responsive to the temperature in said first flow control chamber for positioning said first cylindrical valve sleeve comprises a first elongated bimetallic coil spring member having first and second ends and connected on said first end to said first cylindrical valve sleeve and connected on said second end to said valve housing by first coil support means adjacent one end of said valve housing, said second trol means responsive to the temperature in said second flow chamber comprises a second elongated bimetallic coil having first and second ends with said first end of said second elongated bimetallic coil being connected to said nested cylindrical valve sleeve and additionally including second coil support means mounted on a second end of said valve housing opposite the end of said valve housing to which said first elongated bimetallic coil spring is connected and supportingly engaging said second end of said second elongated bimetallic coil spring.

11. The invention of claim 8 wherein said first control means responsive to the temperature in said first flow control chamber for positioning said first cylindrical valve sleeve comprises a first elongated bimetallic coil spring member having first and second ends and connected on said first end to said first cylindrical valve sleeve and connected on said second end to said valve housing by first coil support means adjacent one end of said valve housing, said second control means responsive to the temperature in said second flow chamber comprises a second elongated bimetallic coil having first and second ends with said first end of said second elongated bimetallic coil being connected to said nested cylindrical valve sleeve and additionally including second coil support means mounted on a second end of said valve housing opposite the end of said valve housing to which said first elongated bimetallic coil spring is connected and adjustably supportingly engaging said second end of said second elongated bimetallic coil spring for permitting selective axial positioning of said nested cylindrical valve sleeve with respect to said first cylindrical valve sleeve.

12. The invention of claim 1 wherein 11 second coil support means includes a series of flat ring washers, each such washer having a coded singular thickness from which series the selection of a particular washer to be installed into the inventive valve will enable said second end of said second elongated coil spring to be positioned for providing a selective rotational adjustment of said second elongated bimetallic coil and said nested cylindrical valve sleeve with respect to a particular rotational position of the said first cylindrical valve sleeve.

13. The invention of claim 12 wherein said second coil support means additionally includes axial adjustment of said second elongated bimetallic coil and said nested cylindrical valve sleeve with respect to the first cylindrical valve sleeve for enabling an adjustment of the flow capacity of the said valve and also for enabling an adjustment of the said valve so as to control an area or a process at a greater or a lesser selected temperature. respect to said first cylindrical valve sleeve for enabling an adjustment of the flow capacity of said valve.

14. The invention of claim 11 wherein said second coil support means includes a support disc fixedly connected to the second end of said second elongated bimetallic coil member, a threaded ring mounting element threadably received in said second end of said valve housing, an axial opening extending through said threaded ring mounting element, manually adjustable knob means mounted for rotation in said axial opening in said ring mounting element, an axial passageway extending the length of said knob means, a socket sleeve screw extending through said axial passageway in said knob means and having a lower threaded end portion, said socket sleeve screw additionally including an axial passageway extending along its length, retaining disc means threadably connected to the lower end of said socket sleeve screw for maintaining said manual knob means and said socket sleeve screw in mounted relationship capable of axial rotation on said threaded ring mounting element, cap screw means extending through said axial passageway in said socket sleeve screw and having a lower end threadably received in said support disc fixedly connected to said second end of said second elongated bimetallic coil member whereby rotation of said cap screw provides axial adjustment of said second elongated bimetallic coil spring member and first and second cylindrical rod members having lower ends fixedly mounted in said support disc and extending in parallel manner upwardly through arcuate slot means formed in said retaining disc, the upper ends of said first and second cylindrical rod members being received in mating apertures in said knob member, so that rotation of said knob member effects rotational adjustment of said rod members, said support disc and said second elongated bimetallic coil spring.

15. An automatic cooling and heating system for maintaining temperature control in an enclosed control area, said system comprising work fluid supply means including a heated work fluid source and a chilled work fluid source, heat exchange means in said control area, said heat exchange having work fluid inlet means and a work fluid exhaust means, a temperature responsive control valve including a hollow valve housing, a first cylindrical valve sleeve mounted for axial rotation in a cylindrical bore in said valve housing and having first and second open-ended internal sleeve chambers on each end separated by a transverse internal wall, said first cylindrical valve sleeve separating the interior of said hollow valve housing into first and second flow control chambers, a nested cylindrical valve sleeve matingly received within said second internal sleeve chamber of said first valve sleeve for axial rotation therein with respect to said first valve sleeve and said housing, a main supply fluid inlet port in said valve housing communicating with said first flow chamber, selectively operable flow control means including conduit means and valve means alternatively providing communication between said main supply fluid inlet port and said heated work fluid source or said chilled work fluid source, outlet port means in said valve housing communicating with said first flow control chamber and connected to supply pipe means extending to the work fluid supply inlet of said heat exchange means, a spent fluid return port in said valve housing communicating with said second flow control chamber and connected to conduit means connected to the work fluid exhaust means of said heat exchange means, feed return port means in said housing communicating with said second flow chamber and connected by conduit means to a feed inlet on said work fluid supply means, a spent fluid return sleeve port in said second internal chamber of said cylindrical valve sleeve, a first control means responsive to the temperature of work fluid in said first flow control chamber for rotationally positioning said first cylindrical valve sleeve in accordance with the temperature of fluid in said first flow chamber, a flow modulating sleeve port in said nested cylindrical valve sleeve rotationally positionable in varying degrees of alignment with said speed fluid return sleeve port, a second control means connected to said nested cylindrical valve sleeve responsive to the temperature of fluid in said second flow chamber for positioning said flow modulating sleeve port with respect to said spent fluid return sleeve port for adjusting the degree of alignment between said flow modulating sleeve port and said speed fluid return sleeve port in accordance with the temperature in said second chamber for providing a modulated controlled liquid flow through the system to maintain a desired temperature in said control area.

16. The invention of claim 15 wherein said control area comprises a process vessel, said first control means rsponsive to the temperature of work fluid in said first flow control chamber for positioning said first cylindrical valve sleeve comprises an elongated bimetallic coil spring member having first and second ends and connected on said first end to said first cylindrical valve sleeve and additionally including support means mounted on said valve housing and supportingly engaging said second end of said bimetallic coil spring member.

17. The invention of claim 15 wherein said first control means responsive to the temperature of work fluid in said first flow control chamber comprises a first elongated bimetallic coil spring member having first and second ends and connected on said first end to said first cylindrical valve sleeve and connected on said second end to said valve housing by first coil support means adjacent one end of said valve housing, said second control means responsive to the temperature of fluid in said second flow chamber comprises a second elongated bimetallic coil having first and second ends with said first end of said second elongated bimetallic coil being connected to nested cylindrcal valve sleeve and additionally including second soil support means mounted on a second end of said valve housing opposite the end of said valve housing to which said first elongated bimetallic coil spring is connected and supportingly engaging said second end of said second elongated bimetallic coil spring.

18. The invention of claim 15 wherein said first control means responsive to the temperature of work fluid in said first flow control chamber for positioning said first cylindrical valve sleeve comprises a first elongated bimetallic coil spring member having first and second ends and connected on said first end to said first cylindrical valve sleeve and connected on said second end to said valve housing by first coil support means adjacent one end of said valve housing, said second control means responsive to the temperature of fluid in said second flow chamber comprises a second elongated bimetallic coil having first and second ends with said first end of said second elongated bimetallic coil being connected to said nested cylindrical valve sleeve and additionally including second coil support means mounted on a second end of said valve hosuing opposite the end of said valve housing to which said first elongated bimetallic coil spring is connected and adjustably supportingly engaging said second end of said second elongated coil spring for permitting selective axial positioning of said nested cylindrical valve sleeve with respect to said first cylindrical sleeve.

19. The invention of claim 18 wherein said second coil support means includes a series of flat ring washers, each such washer having a coded singular thickness from which series the selection of a particular washer to be installed into the inventive valve will enable said second end of said second elongated bimetallic coil spring to be positioned for providing a selection of rotational adjustments of said second elongated bimetallic coil and said nested valve sleeve with respect to a particular rotational position of the said first cylindrical valve sleeve.

20. The invention of claim 19 wherein said fitting support additionally includes axial adjustment of said second elongated bimetallic coil and said nested cylindrical valve sleeve with respect to the first cylindrical valve sleeve for enabling an adjustment of the flow capacity of the said valve and also for enabling an adjustment of the said valve so as to control an area or a process at a greater or a lesser temperature. Such axial adjustment, as opposed to the adjustment of claim 19, being made posterior of the installation of the said valve and being made as needed during the operation from the exterior surface of the housing of the said valve, only with the aid of a selected tool.

21. The invention of claim 18 wherein said second support means includes a support disc fixedly connected to the second end of said second elongated bimetallic coil member, a threaded ring mounting element threadably received in said second end of said valve housing, an axial opening extending through said threaded ring mounting element, manually adjustable know means mounted for rotation in said axial opening in said ring mounting element, an axial passageway extending the length of said knob means, a socket sleeve screw extending through said axial passageway in said knob means and having a lower threaded end portion, said socket sleeve screw additionally incuding an axial passagway extending along its length, retaining disc means threadably connected to the lower end of said socket sleeve screw for maintaining said manual knob means and said socket sleeve screw in mounted relationship capable of axial rotation on said threaded ring mounting element, cap screw means extending through said axial passageway in said socket sleeve screw and having a lower end threadably received in said support disc fixedly connected to said second end of said second elongated bimetallic coil member whereby rotation of said cap screw provides axial adjustment of said second elongated bimetallic coil spring member and first and second cylindrical rod members having lower ends fixedly mounted in said support disc and extending in parallel manner upwardly through arcuate slot means formed in said retaining disc, the upper ends of said first and second cylindrical rod members being received in mating apertures in said knob member, so that rotation of said knob member effects rotational adjustment of said rod members, said support disc and said second elongaged bimetallic coil spring.

22. A temperature responsive control valve comprising a housing having first and second chambers and a number of fluid line connections, a first valve member in said first chamber, a second valve member in said second chamber, means responsive to the temperature of fluid flowing in the said first chamber for regulating said first valving member in the first chamber and said second valving member in said second chamber; means responsive to the temperature of the fluid flowing in the said second chamber for regulating a third valving member within said second chamber and means movable to adjust one or more of the valving members within one or more of the chambers.

23. The invention of claim 22 wherein the said means movable to adjust one or more of the valving members within one or more of the said chambers is exterior to the said housing of the said temperature responsive control valve.

24. The invention of claim 22 wherein the said means movable to adjust one or more of the said valving members within one or more of the said chambers are manually movable to fixed positions and can be moved during the operation of the said valve.

25. The invention of claim 22 wherein the said housing of the said valve has two inlet fluid connections and four outlet fluid connections, a first inlet connection communicates with the said first chambr and a second inlet connection communicates with the said second chamber of the said valve, a first outlet connection and a second outlet connection both communicate with the said first chamber and are centrally located on a common circumference of the said housing of the said valve, a third outlet connection and a fourth outlet connection both communicate with the said second chamber and are centrally located on a common circumference of the said housing of the said valve, said means responsive to the temperature of the fluid flow in the said first chamber is located between the first inlet connection and the first common circumference and the means responsive to the temperature of the fluid flow in the said second chamber is located between the said second inlet connection and the said second common circumference.

26. The invention of claim 22 wherein the said valve, when installed in the closed circuits of a heating and cooling system, receives work fluid from a boiler or a chiller via the said first inlet connection into the said first chamber, work fluid bathes or soaks the said means responsive to the temperature of the fluid in the said first chamber; and whereby, the said first valving member directs the flow of the fluid from the said first chamber via the said first outlet connection to the user member of the heating fluid in the system whenever heating fluid is flowing through the said first inlet connection, and also, directs the flow of fluid from the said first chamber via the said second outlet connection to the user member of the cooling in the system whenever cooling fluid is flowing through the said first inlet connection; and whereby, the said second valving member directs the used or spent fluid entering the said second chamber via the said second inlet connection of the said valve to the boiler via the said third outlet connection whenever heating fluid is flowing through the said first inlet connection, and also, directs the used or spent fluid entering the said second chamber via the said second inlet connection of the said valve to the chiller via the said fourth outlet connection whenever cooling fluid is flowing through the said first inlet connection so that the said valve automatically changes the sytem of the heating mode of operation to the cooling mode of operation and vice-versa.

27. The invention of claim 25 wherein the said valve, when installed in the closed circuits of a heating and cooling system, receives work fluid from a boiler or a chiller via the said first inlet connection into the said first chamber, work fluid bathes or soaks the said means responsive to the temperature of the fluid in the said first chamber; and whereby, the said first valving member directs the flow of the fluid from the said first chamber via the said first outlet connection to the user member of the heating fluid in the system whenever heating fluid is flowing through the said first inlet connection, and also, directs the flow of fluid from the said first chamber via the said second outlet connection to the user member of the cooling in the system whenever cooling fluid is flowing through the said first inlet connection; and whereby, the said second valving member directs the used or spent fluid entering the said second chamber via the said second inlet connection of the said valve to the boiler via the said third outlet connection whenever heating fluid is flowing through the said first inlet connection, and also, directs the used or spent fluid entering the said second chamber via the said second inlet connection of the said valve to the chiller via the said fourth outlet connection whenever cooling fluid is flowing through the said first inlet connection so that the said valve automatically changes the system from the heating mode of operation to the cooling mode of operation and vice-versa.

28. The invention of claim 22 wherein the said second valving member constantly adjusts the flow of the fluid in both the heating and the cooling modes of the system through the said valve and consequently through the system in accordance with the temperature of the fluid flowing through the said first chamber and in conjunction with the said third valving member, the said third valving member constantly adjusts the flow of the fluid in both the heating and the cooling modes of the system through the valve and consequently through the system but in accordance with the temperature of the fluid flowing through the said second chamber whereby the said valve portions or meters the flow of fluid through the system according to the temperature of the used or spent fluid of the system and so does regardless of the variations of the temperatures of the infeed fluids, the fluids entering the said valve from the boiler of the system or from the chiller of the system, and maintains a more constant temperature in an area or in a process; the more constant temperature being of a selective and manually achieved value.

29. The invention of claim 25 wherein the said second valving member constantly adjust the flow of the fluid in both the heating and the cooling modes of the system through the said valve and consequently through the system in accordance with the temperature of the fluid flowing through the said first chamber and in conjunction with the said third valving member, the said third valving member constantly adjusts the flow of the fluid in both the heating and the cooling modes of the system through the valve and consequently through the system but in accordance with the temperature of the fluid flowing through the said second chamber whereby the said valve portions or meters the flow of fluid through the system according to the temperature of the used or spent fluid of the system and so does regardless of the variations of the temperatures of the infeed fluids, the fluids entering the said valve from the boiler of the system or from the chiller of the system, and maintains a more constant temperature in an area or in a process; the more constant temperature being of a selective and manually achieved valve.

30. The invention of claim 26 wherein the said second valving member constantly adjusts the flow of the fluid in both the heating and the cooling modes of the system through the said valve and consequently through the system in accordance with the temperature of the fluid flowing through the said first chamber and in conjunction with the said third valving member, the said third valving member constantly adjusts the flow of the fluid in both the heating and the cooling modes of the system through the valve and consequently through the system but in accordance with the temperature of the fluid flowing through the said second chamber whereby the said valve portions or meters the flow of fluid through the system according to the temperature of the used or spent fluid of the system and so does regardless of the variations of the temperatures of the infeed fluids, the fluids entering the said valve from the boiler of the system or from the chiller of the system, and maintains a more constant temperature in an area or in a process; the more constant temperature being of a selective and manually achieved value.

31. The invention of claim 22 wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the said first chamber directly to the said second chamber and to the boiler or to the chiller and in this manner reduces the pressure in the said first, second and third valving members of the said valve.

32. The invention of claim 25 wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the said first chamber directly to the said second chamber and to the boiler or to the chiller and in this manner reduces the pressure in the said first, second and third valving members of the said valve.

33. The invention of claim 26 wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valves, the said fluid pressure equalizing or reducing member bypasses some of the fluid from the said first chamber directly to the said second chamber and to the boiler or to the chiller and in this manner reduces the pressures in the said first, second and third valving members of the said valve.

34. The invention of claim 28 wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the said first chamber directly to the said second chamber and to the boiler or to the chiller and in this manner reduces the pressure in the said first, second and third valving members of the said valve.

35. A temperature responsive control valve comprising a housing having a number of fluid line connections, the housing having first and second separate chambers, the chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein there are three valving members within a single housing and wherein there are two temperature responsive means responsive to the temperatures of the fluids flowing through the said housing in each of two distinct passes of the fluids through the valve, a first pass of work fluid through the first chamber soaking the first temperature responsive means and a second pass of used or spent fluid through said second chamber soaking said second temperature responsive means; and whereas, the first and the second said valving members are coordinated to and operate in conjunction with the said first temperature responsive means, however, the said first valving member operates in the said first chamber but the said second valving member operates in the said second chamber and the said third valving member is coordinated to and operates in conjunction with the said second temperature responsive means in the said second chamber independently of, meanswise, the said second valving member but upon the same said second pass of used or spent fluid and during the identical intervals of time: and, when applied to a heating and cooling system, these continuous and automatic valving members do: distinguish heating fluid from cooling fluid, direct heating fluid to a heating fluid user, direct cooling fluid to a cooling fluid user, quantitatively portion the heating fluid as to the needs of the system, quantitatively portion the cooling fluid as to the needs of the system, direct the used or spend heating fluid to the heating fluid boiler or reenergizer unit, direct the used or spent cooling fluid to the chiller or to the deenergizing unit, adjust the flow of the fluid through the said valve according to the temperature of the fluid of the said first pass, and, react to the manual adjustments of the parameters of the said valve in both the heating and the cooling modes of the operations of the said valve, and automatically change from the one operating mode to the other.

36. The invention of claim 35 wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the first chamber directly to the said second chamber and to the boiler or to the chiller and in this manner reduces the pressure in the said first, second and third valving members of the said valve.

37. A temperature responsive control valve comprising a housing having a numner of fluid line connections, the housing having first and second chambers, the chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein the said means movable to adjust one or more of the valving members within one or more of the said chambers is exterior to said housing and there are three of said valving members within a single said housing and wherein there are two of said temperature responsive means responsive to the temperature of the fluids flowing through the said housing in each of two distinct passes of the fluids through the valve, a first pass of work fluid through said first chamber soaking the first temperature responsive means and a second pass of used or spent fluid through said second chamber soaking said second temperature responsive means; and whereas, the first and the second said valving members are coordinated to and operate in conjunction with the said first temperature responsive means, however, the said first valving member operates in the said first chamber but the said second valving member operated in the said second chamber and the said third valving member is coordinated to and operates in conjunction with the said second means in the said second chamber independently of, meanswise, the said second valving member but upon the same said second pass of used or spent fluid and during the identical intervals of time: and, when applied to a heating and cooling system, these continuous and automatic valving members do: distinguish heating fluid from cooling fluid, direct heating fluid to a heating fluid user, direct cooling fluid to a cooling fluid user, quantitatively portion the heating fluid as to the needs of the needs of the system, direct the used or spent heating fluid to the heating fluid boiler or reenergizer unit, direct the used or spent cooling fluid to the chiller or to the deenergizing unit, adjust the flow of the fluid through the said valve according to the temperature of the fluid of the said first pass, and, react to the manual adjustments of the parameters of the said valve in both the heating and the cooling modes of the operations of the said valve, and automatically change from the one operating mode to the other.

38. A temperature responsive control valve comprising a housing having a number of fluid line connections, the housing having first and second chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein the said means movable to adjust one or more of the said valving members within one or more of the said chambers are manually movable to fixed positions and can be moved during the operation of the said valve and wherein there are three of said valving members within a single said housing and wherein there are two of said temperature responsive means responsive to the temperatures of the fluids flowing through the said housing in each of two distinct passes of the fluids through the valve, a first pass of work fluid through the first said chamber soaking the first said temperature responsive means and a second pass of used or spent fluid through the said second chamber soaking the said second temperature responsive means; and whereas, the first and the second valving members are coordinated to and operate in conjunction with the said second means in the said second chamber independently of, meanswise, the said second valving member but upon the same said second pass of used or spent fluid and during the identical intervals of time: and, when applied to a heating and cooling system, these continuous and automatic valving members do: distinguish heating fluid from cooling fluid, direct heating fluid to a heating fluid user, direct cooling fluid to a cooling fluid user, quantitatively portion the heating fluid as to the needs of the system, quantitatively portion the cooling fluid as to the needs of the system, direct the used or spent heating fluid to the heating fluid boiler or reenergizer unit, direct the used or spent cooling fluid to the chiller or to the deenergizing unit, adjust the flow of the fluid through the said valve according to the temperature of the fluid of the said first pass, and, react to the manual adjustments of the parameters of the said valve in both the heating and the cooling modes of the operations of the said valve, and automatically change from the one operating mode to the other.

39. A temperature responsive control valve comprising a housing having a number of fluid line connections, the housing having first and second chambers, the chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the said first chamber directly to the said second chamber and to the boiler or to the chiller and in this manner reduces the pressure in the said first, second and third valving members of the said valve.

40. A Temperature responsive control valve comprising a housing having a number of fluid line connections, the housing having first and second chambers, the chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein the said means movable to adjust one or more of the valving members within one or more of the said chambers is exterior to said housing and wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member by-passes some of the fluid from the said first chamber directly to the said second chamber and to the boiler or to the chiller and in this manner reduces the pressure in the said first, second and third valving members of the said valve.

41. A temperature responsive control valve comprising a housing having a number of fluid line connections, the housing having first and second chambers, the chambers having fluid valving members, temperature responsive means responsive to the temperatures of the fluids within one or more of the chambers to operate or regulate or position the valving members within one or more of the chambers; and means movable to adjust one or more of the valving members within one or more of the chambers, wherein the said means movable to adjust one or more of the said valving members within one or more of the said chambers are manually movable to fixed positions and can be moved during the operation of the said valve and wherein there is a separating member which separates the said first chamber from the said second chamber within the said housing or within one or more of the said valving members having a fluid pressure equalizing or reducing member enabling the said valve to be used in heating and cooling systems which operate at higher pressures to benefit valves other than the said inventive valve, the said fluid pressure equalizing or reducing member bypasses some of the fluid from the said first chamber directly to the said second chamber and to the boiler or to the chiller and in this manner reduce the pressure in the said first, second and third valving members of the said valve.

* * * * *